(12) United States Patent
Nakamura et al.

(10) Patent No.: US 11,557,805 B2
(45) Date of Patent: Jan. 17, 2023

(54) BATTERY PACK

(71) Applicant: MURATA MANUFACTURING CO., LTD., Kyoto (JP)

(72) Inventors: Tsuyoshi Nakamura, Kyoto (JP); Masaaki Sugiyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 7 days.

(21) Appl. No.: 16/353,746

(22) Filed: Mar. 14, 2019

(65) Prior Publication Data

US 2019/0214618 A1 Jul. 11, 2019

Related U.S. Application Data

(63) Continuation of application No. PCT/JP2017/029590, filed on Aug. 18, 2017.

(30) Foreign Application Priority Data

Oct. 24, 2016 (JP) .............................. JP2016-208144

(51) Int. Cl.
*H01M 50/20* (2021.01)
*H01M 10/613* (2014.01)
(Continued)

(52) U.S. Cl.
CPC ............. *H01M 50/20* (2021.01); *B60L 50/64* (2019.02); *H01M 10/613* (2015.04);
(Continued)

(58) Field of Classification Search
CPC ....................................................... H01M 2/10
See application file for complete search history.

(56) References Cited

U.S. PATENT DOCUMENTS 6,054,224 A * 4/2000 Nagai ...................... H01B 3/42
428/480
2003/0017383 A1 * 1/2003 Ura ..................... F28D 15/0275
429/120

(Continued)

FOREIGN PATENT DOCUMENTS

CN 102460769 5/2012
EP 2784869 B1 * 10/2016 .......... H01M 10/613

(Continued)

OTHER PUBLICATIONS

Engineering ToolBox, (2003). Young's Modulus—Tensile and Yield Strength for some common Materials. [online] Available at: https://www.engineeringtoolbox.com/young-modulus-d_417.html [Accessed Jul. 30, 2021]. (Year: 2003).*

(Continued)

*Primary Examiner* — Haroon S. Sheikh
(74) *Attorney, Agent, or Firm* — K&L Gates LLP

(57) ABSTRACT

A battery pack is provided. The battery pack includes a battery cell assembly including at least a battery cell, a heat dissipation member, and a plate member; and an exterior case. The heat dissipation member and the plate member are disposed in this order on one or both of an electrode of the battery cell and a side surface of the battery cell along a direction in which the battery cell assembly is assembled in the exterior case.

12 Claims, 12 Drawing Sheets

(51) Int. Cl.
  *H01M 10/6235* (2014.01)
  *H01M 10/625* (2014.01)
  *H01M 10/643* (2014.01)
  *H01M 10/6551* (2014.01)
  *H01M 10/6554* (2014.01)
  *B60L 50/64* (2019.01)
  *H01M 10/627* (2014.01)
  *H01M 10/653* (2014.01)
  *H01M 50/256* (2021.01)

(52) U.S. Cl.
  CPC ....... *H01M 10/625* (2015.04); *H01M 10/627* (2015.04); *H01M 10/6235* (2015.04); *H01M 10/643* (2015.04); *H01M 10/653* (2015.04); *H01M 10/6551* (2015.04); *H01M 10/6554* (2015.04); *H01M 50/256* (2021.01); *H01M 2220/20* (2013.01)

(56) References Cited

U.S. PATENT DOCUMENTS

| | | | | |
|---|---|---|---|---|
| 2010/0310919 | A1* | 12/2010 | Villarreal | H01M 10/6554 429/120 |
| 2013/0112551 | A1* | 5/2013 | Fritz | C25C 7/00 204/267 |
| 2014/0023906 | A1 | 1/2014 | Hashimoto et al. | |
| 2014/0377623 | A1* | 12/2014 | Pyzza | H01M 10/61 429/120 |
| 2015/0064540 | A1 | 3/2015 | Roh et al. | |
| 2015/0079444 | A1 | 3/2015 | Baumgartner et al. | |
| 2016/0141735 | A1* | 5/2016 | Motohashi | H01M 10/625 429/120 |
| 2016/0197384 | A1* | 7/2016 | DeKeuster | G01R 31/3835 429/120 |
| 2017/0025653 | A1* | 1/2017 | March | H01M 50/20 |

FOREIGN PATENT DOCUMENTS

| | | |
|---|---|---|
| JP | 2015520922 A | 7/2015 |
| WO | 2012133708 A1 | 10/2012 |

OTHER PUBLICATIONS

International Search Report for Application No. PCT/JP2017/029590, dated Sep. 19, 2017.

Chinese Office Action dated Jun. 25, 2021 in corresponding Chinese Application No. 201780058519.7.

Chinese Office Action dated Apr. 13, 2022 in corresponding Chinese Application No. 201780058519.7.

\* cited by examiner

BATTERY PACK

CROSS REFERENCE TO RELATED APPLICATIONS

The present application is a continuation of PCT patent application no. PCT/JP2017/029590, filed on Aug. 18, 2017, which claims priority to Japanese patent application no. JP2016-208144 filed on Oct. 24, 2016, the entire contents of which are being incorporated herein by reference.

BACKGROUND

The present technology generally relates to a battery pack, more particularly to a battery pack, a vehicle, a power storage system, an electric tool, and an electronic device.

In recent years, a demand for a battery pack is rapidly expanding in technical fields such as electronic devices such as personal computers and mobile communication terminals, automobiles such as an electric automobile, and new energy systems such as wind power generation.

For example, a battery unit includes a main accommodation case including a power supply output terminal, at least one submodule accommodated in the main storage case, and a controller that is accommodated in the main accommodation case and controls at least one of charging and discharging of a unit battery. In the submodule, at least two battery blocks each of which includes a plurality of unit batteries are accommodated in a sub accommodation case such that a terminal is not exposed, and the battery blocks are connected to each other by an electric connection member.

SUMMARY

In the conventional technology, there is a risk that improvement of heat dissipation is not achieved. Thus, for now, there is a further demand for the battery pack in which the heat dissipation is improved.

The present technology has been made in view of such circumstances, and one of objects of the present technology is to provide a battery pack having excellent heat dissipation, a vehicle, a power storage system, an electric tool, and an electronic device, which include the battery pack.

As a result of extensive research to solve the object, the present inventors have successfully developed the battery pack having the excellent heat dissipation, and completed the present technology.

According to an embodiment of the present disclosure, a battery pack is provided. The battery pack includes a battery cell assembly including at least a battery cell, a heat dissipation member, and a plate member; and an exterior case. The heat dissipation member and the plate member are disposed in this order on one or both of an electrode of the battery cell and a side surface of the battery cell along a direction in which the battery cell assembly is assembled in the exterior case.

According to an embodiment of the present disclosure, the exterior case included in the battery pack of the present technology may include a surface opposed to a main surface of the plate member.

The exterior case may include a tubular case according to an embodiment of the present disclosure.

The tubular case may include one or both of a top surface and a bottom surface according to an embodiment of the present disclosure.

The tubular case may not include one of both of an upper surface and a bottom surface according to an embodiment of the present disclosure.

The exterior case may include a pair of exterior half bodies according to an embodiment of the present disclosure.

The exterior case may include a metallic material according to an embodiment of the present disclosure.

The plate member included in the battery pack of the present technology may include a first surface substantially perpendicular to a direction in which the battery cell assembly is assembled in the exterior case according to an embodiment of the present disclosure.

The first surface included in the plate member may be formed by bending the plate member from an end of the plate member according to an embodiment of the present disclosure.

The plate member may contact with an inner wall surface of the exterior case, and the inner wall surface is opposed to a main surface of the plate member, and the battery cell assembly may be accommodated in the exterior case according to an embodiment of the present disclosure.

The plate member may contact with an inner wall surface of the exterior case, and the inner wall surface is opposed to a main surface of the plate member with heat dissipation grease interposed therebetween, and the battery cell assembly may be accommodated in the exterior case according to an embodiment of the present disclosure.

The plate member may include a nonelastic material according to an embodiment of the present disclosure.

The heat dissipation member included in the battery pack of the present technology may include an elastic material according to an embodiment of the present disclosure.

The heat dissipation member may include insulating material, and the plate member may include a metal material according to an embodiment of the present disclosure.

According to an embodiment of the present disclosure, a vehicle includes the battery pack of the present technology as described herein, a drive force converter configured to receive electric power from the battery pack and converts the electric power into drive force of the vehicle, a driver configured to drive the vehicle according to the drive force, and a vehicle control device.

According to an embodiment of the present disclosure, a power storage system includes a power storage device including the battery pack of the present technology as described herein, a power consumption device to which electric power is configured to be supplied from the battery pack, a controller configured to control power supply from the battery pack to the power consumption device, and a power generation device configured to charge the battery pack.

According to an embodiment of the present disclosure, an electric tool includes the battery pack of the present technology as described herein and a movable unit to which electric power is configured to be supplied from the battery pack.

According to an embodiment of the present disclosure, an electronic device includes the battery pack of the present technology as described herein and the electronic device is configured to receive power supply from the battery pack.

The present technology can provide the battery pack having the excellent heat dissipation, the vehicle, the power storage system, the electric tool, and the electronic device, which include the battery pack.

The effects described herein are not necessarily limited, and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

Before describing an outline of the present technology, the problems of the prior art will be described with referring to FIG. 11.

Figure 11:
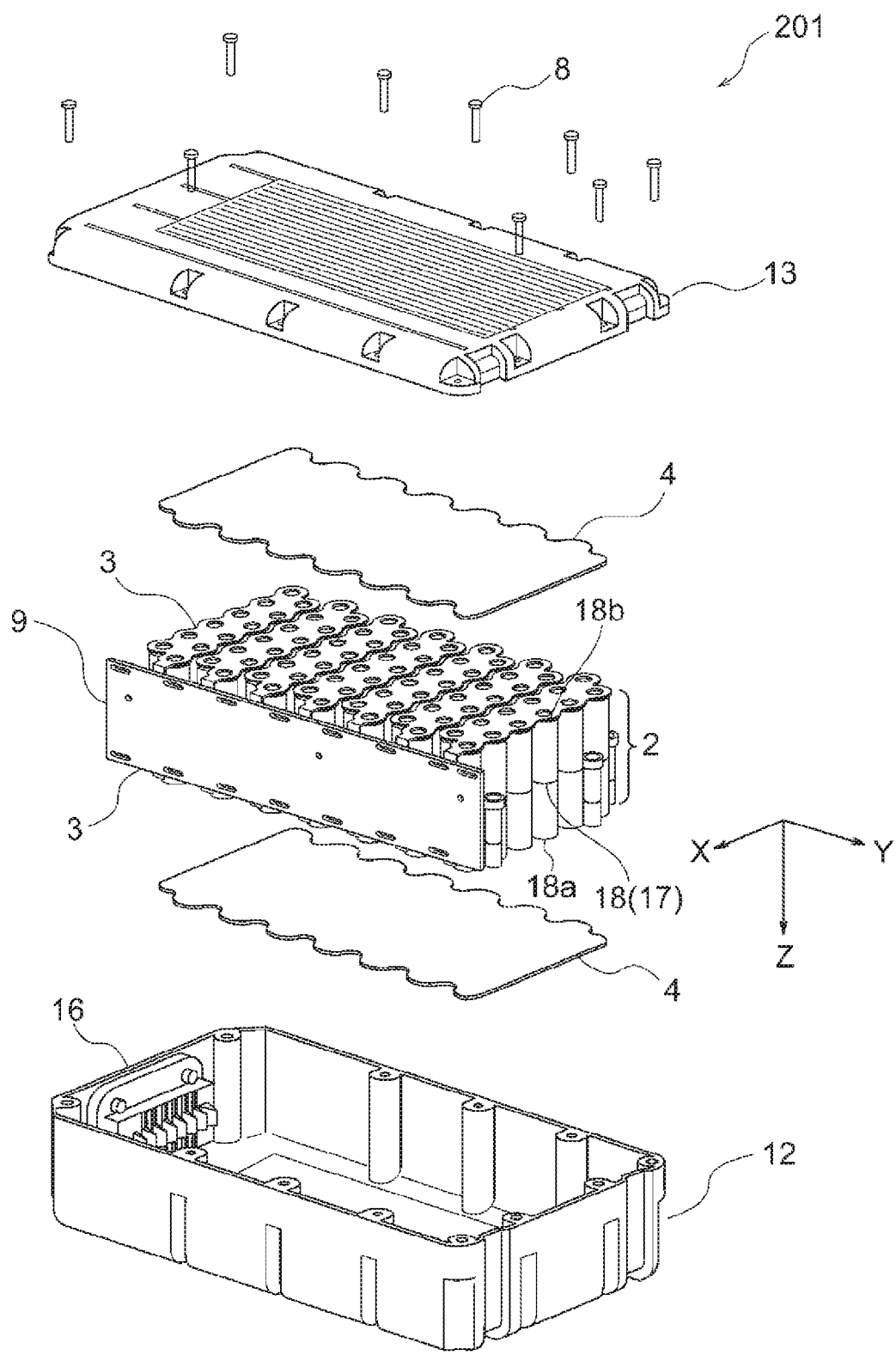
FIG. 11 is an exploded perspective view of a battery pack according to an embodiment of the present technology.

In a battery pack 201 of FIG. 11, in order to effectively perform the heat dissipation by transferring heat generation of a battery cell 18 to an exterior half body lower case 12 and an exterior half body upper case 13, a heat dissipation member 4 is mounted on an aggregate of battery cells 2 including a plurality of battery cells 18 with an electrode tab 3 connected to each of the first electrode 18a and the second electrode 18b interposed therebetween on a surface (an X-axis direction and a Y-axis direction in FIG. 11) substantially perpendicular to an assembly direction (a Z-axis direction in FIG. 11) of the exterior half body lower case 12 and the exterior half body upper case 13.

The battery pack 201 has an exterior case constructed with at least two components of the exterior half body lower case 12 and the exterior half body upper case 13, and has a structure in which the heat dissipation member 4 is brought into close contact with insides of the exterior half body lower case 12 and the exterior half body upper case 13.

In the battery pack 201, the heat is transferred from the heat dissipation surface (on the first electrode 18a, on the second electrode 18b and/or on the electrode tab 3) of the aggregate of battery cells 2 to the exterior case, so that sometimes a temperature difference in each of the plurality of battery cells 18 is hardly uniformized due to an interface 16 existing between the exterior half body lower case 12 and the exterior half body upper case 13.

Sometimes an O-ring is inserted between the exterior half body lower case 12 and the exterior half body upper case 13 in order to ensure waterproofness. However, because the O-ring divides the exterior half body lower case 12 and the exterior half body upper case 13, temperatures of the plurality of batteries are unevenly cooled, battery performance tends to be degraded, and sometimes a battery life is shortened.

A volume of the exterior half body lower case 12 and a volume of the exterior half body upper case 13 are different from each other, so that the temperature difference in each of the plurality of batteries cannot be uniformized. Specifically, because the volume of the exterior half body upper case 13 is smaller than the volume of the exterior half body lower case 12, the exterior half body upper case 13 tends to be filled with the heat generated from an electrode tab welding surface of the aggregate of battery cells 2 as compared with the exterior half body lower case 12, and sometimes the temperature difference between the plurality of batteries is increased.

The present technology is based on the above situation, and a battery pack includes: a battery cell assembly including a battery cell, a heat dissipation member, and a plate member; and an exterior case. In the battery pack, the heat dissipation member and the plate member are disposed in this order on at least one of (1) at least one electrode of the battery cell and (2) a side surface of the battery cell. The batteries are uniformly cooled by the battery pack, the temperature in the exterior case is kept uniform, and the effect of the excellent dissipation is exerted. Consequently, a life of the battery cell can be lengthened to contribute to improvement and maintenance of an excellent battery characteristic or reliability of the battery pack.

The battery pack of the present technology is formed by accommodating a battery such as a lithium ion battery in the exterior case (battery pack case). The battery pack is applied to a vehicle, a power storage system, an electric tool, an electronic device, and the like.

A battery pack 101 of a first embodiment (an example of the battery pack) according to the present technology will be described with reference to FIGS. 1 to 5.

Figure 1:
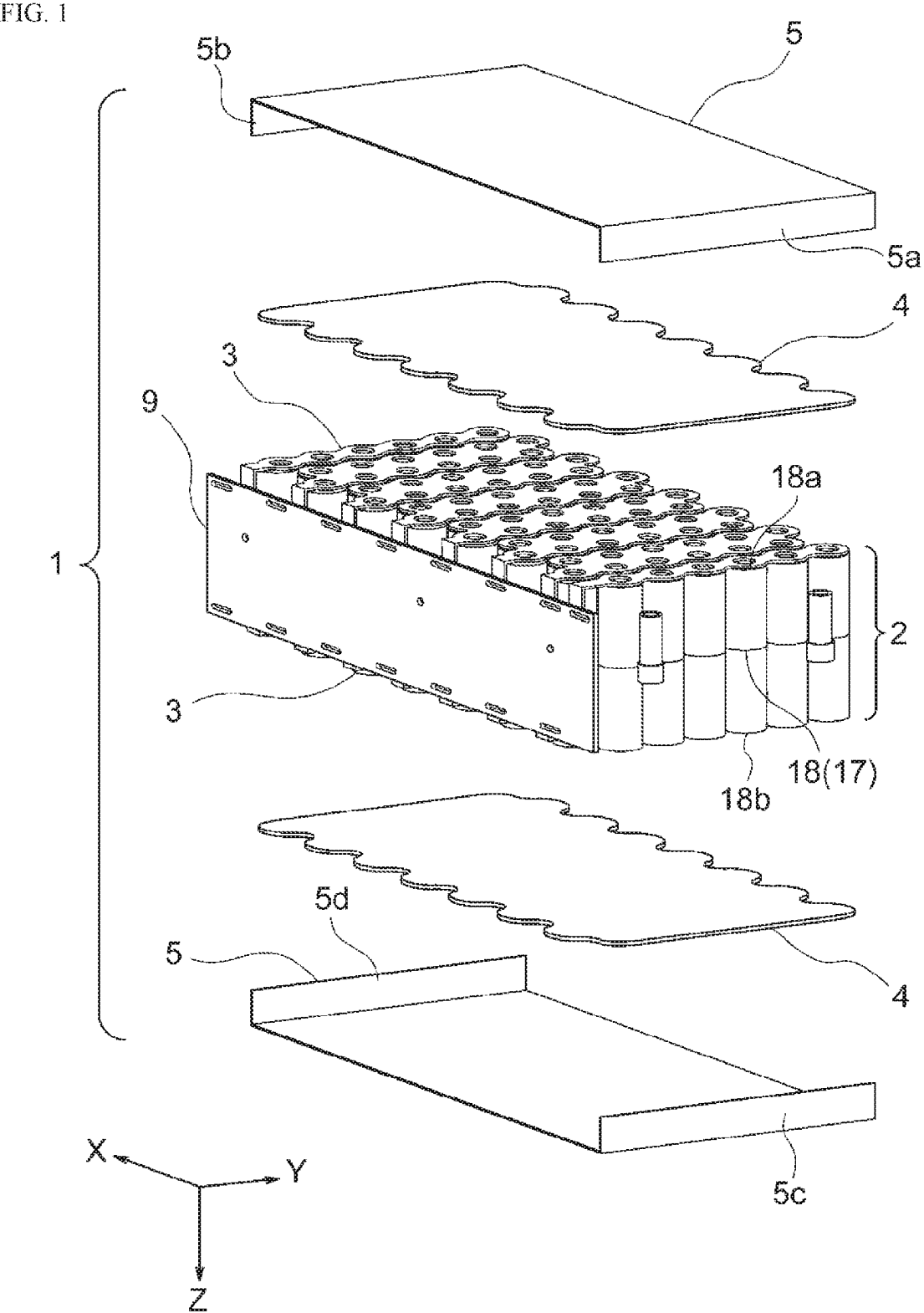
FIG. 1 is an exploded perspective view illustrating a battery cell assemblies included in a battery pack according to an embodiment of the present technology.
Figure 2:
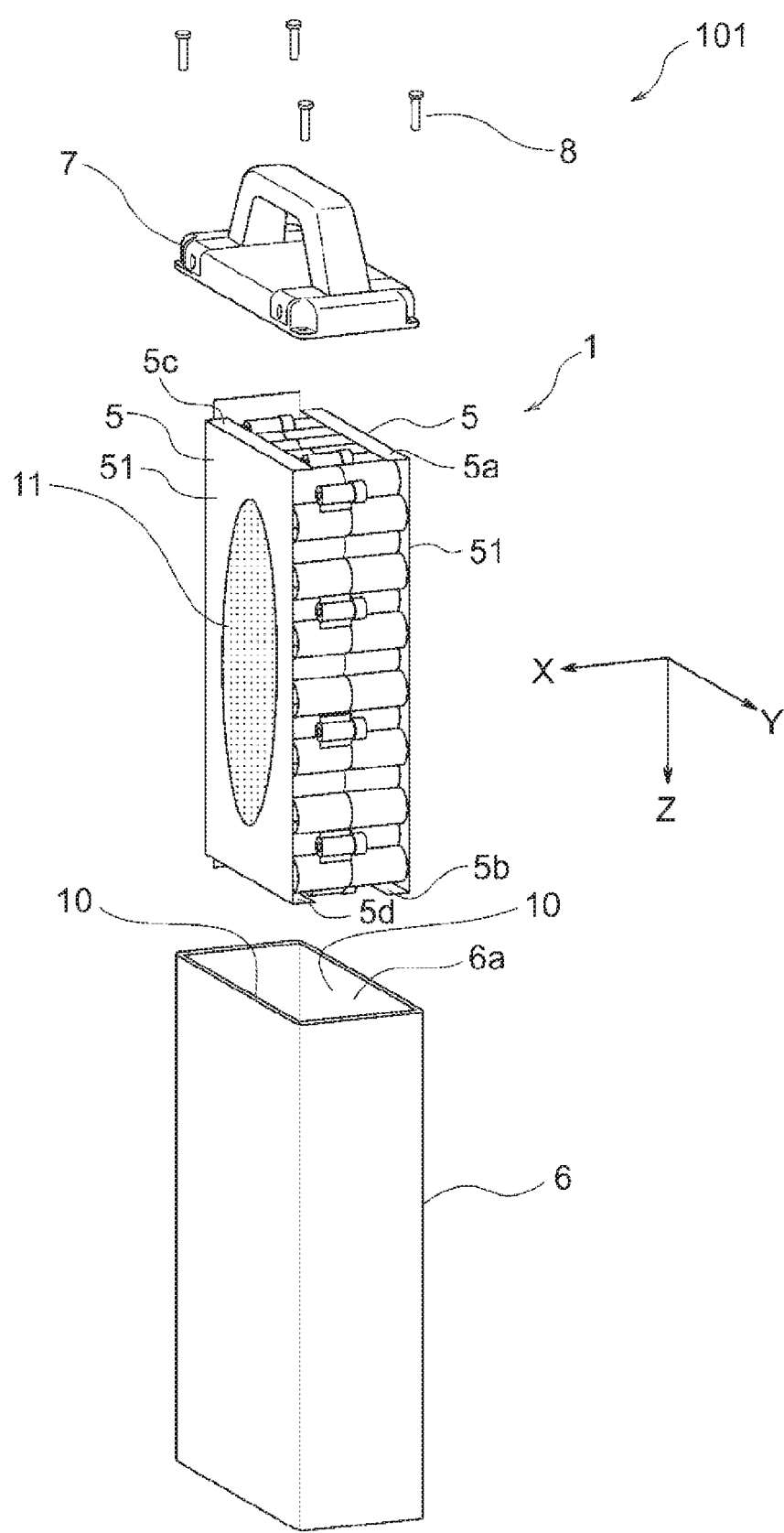
FIG. 2 is an exploded perspective view illustrating the battery pack according to an embodiment of the present technology.
Figure 3:
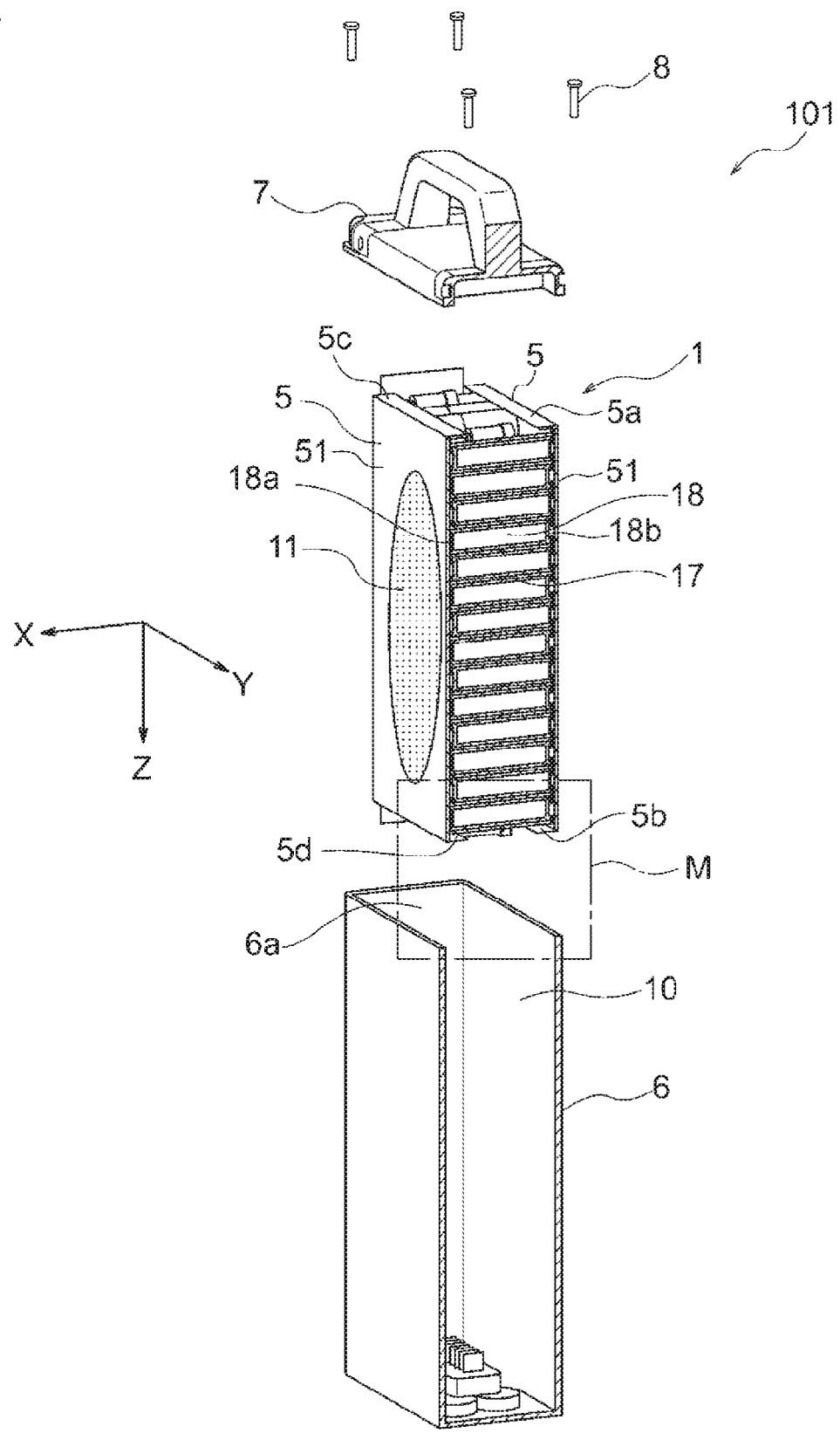
FIG. 3 is an exploded sectional perspective view illustrating battery pack according to an embodiment of the present technology.

FIG. 1 is an exploded perspective view of the battery cell assembly 1. FIG. 2 is an exploded perspective view of the battery pack 101. FIG. 3 is an exploded sectional perspective view of the battery pack 101. As illustrated in FIGS. 1 to 3, the battery pack 101 includes at least the battery cell assembly 1 including the aggregate of battery cells 2 including the plurality of battery cells 18, two heat dissipation members 4, and two plate members 5 and the exterior case constructed with the tubular case 6 (the main body of the exterior case) and a top lid 7 (a top surface of the exterior case). In the battery pack 101, the heat dissipation member 4 and the plate member 5 are disposed in this order on each of the first electrode 18a and the second electrode 18b of the battery cell 18 along a direction (a Z-axis direction in FIG. 2) in which the battery cell assembly 1 is assembled in the exterior case (tubular case 6).

In FIGS. 1 to 3, the battery pack 101 includes two heat dissipation members 4 and two plate members 5. Alternatively, for example, the battery pack 101 may include one heat dissipation member 4 and one plate member 5. In this case, in the battery pack 101, along the direction (the Z-axis direction in FIG. 2) in which the battery cell assembly 1 is assembled to the exterior case (tubular case 6), the heat dissipation member 4 and the plate 5 are disposed in this order in one of the first electrode 18a and the second electrodes 18b of the battery cell 18.

Figure 4:
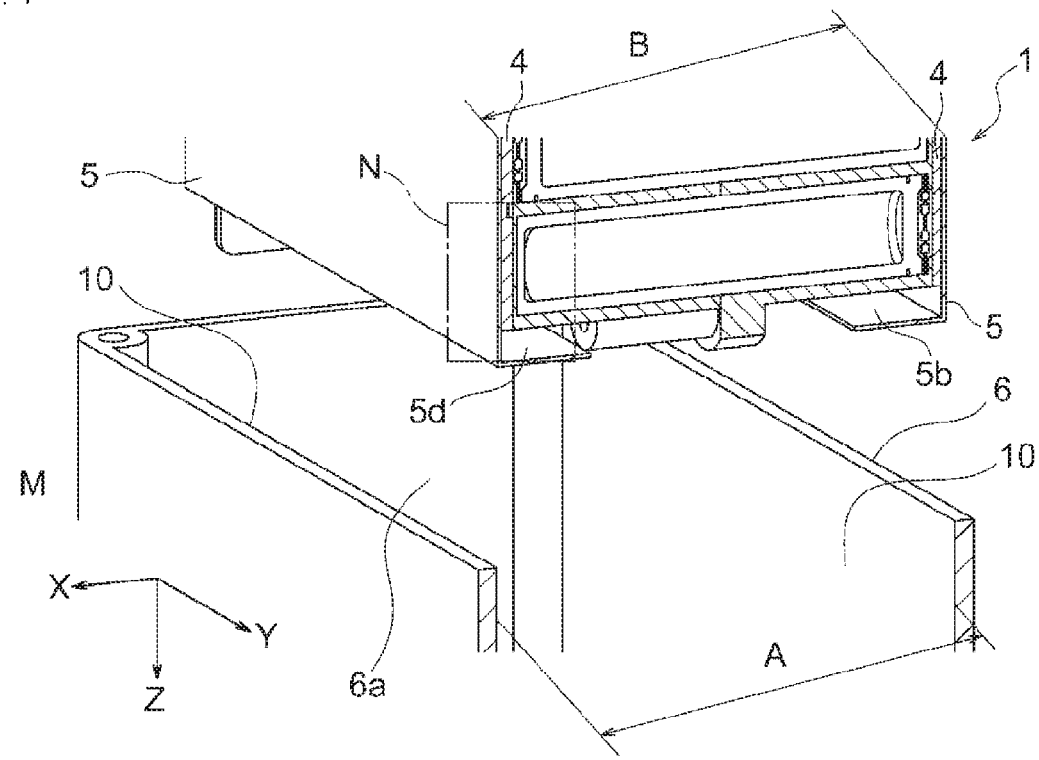
FIG. 4 is an enlarged sectional perspective view illustrating the battery pack according to an embodiment of the present technology.

FIG. 4 is an enlarged sectional perspective view illustrating a portion M of the battery pack 101 in FIG. 3. One of the features of the battery pack 101 is that a distance B between outer end faces of the two plate members 5 included in the battery cell assembly 1 is larger than an internal distance A of the tubular case 6 in FIG. 4. Only when the battery cell assembly 1 is assembled in the tubular case 6, the two heat dissipation members 4 are compressed to temporarily keep the distance B shorter than the internal distance A using elastic action of the two heat dissipation members 4, which allows the two heat dissipation members 4 to be disposed in substantially parallel to the assembling direction (the Z-axis direction in FIG. 4) along the direction (the Z-axis direction in FIG. 4) in which the battery cell assembly 1 is assembled in the tubular case 6. Because the plate member 5 and the inside side surface 10 of the tubular case 6 contact closely with each other by the elastic action of the heat dissipation member 4, which is included in the battery cell assembly 1 and assembled in the tubular case 6, the heat generation of the battery cell 18 is efficiently transferred to the tubular case 6, and the heat dissipation of the battery pack 101 is improved.

When the tubular case 6 included in the battery pack 101 is manufactured, for example, by integral molding and has no interface, two electrode surfaces of the aggregate of battery cells 2 (the electrode tab welding surface in the case of including the electrode tab 3) can uniformly covered, so that the individual temperature of each of the plurality of battery cells 18 can be uniformized. As a result, local performance degradation of the plurality of battery cells 18 is prevented, a life of the battery cells 18 is lengthened, and the battery characteristic or reliability of the battery pack 101 is improved.

In the battery pack 101 (battery cell assembly 1), at least one heat dissipation member may be disposed in a surface (an XY-direction in FIG. 4) substantially perpendicular to the direction (the Z-axis direction in FIG. 4) in which the battery cell assembly 1 is assembled in the tubular case 6. In this case, the heat transfer path is further increased in the battery pack 101, so that the heat dissipation of the battery pack 101 can further be improved.

The battery cell assembly 1 included in the battery pack 101 will be described in detail with reference to FIG. 1.

As described above, the battery cell assembly 1 includes at least the aggregate of battery cells 2 including the plurality of battery cells 18, the two heat dissipation members 4, and the two plate members 5. On the first electrode 18a of the battery cell 18 (in FIG. 1, an outside in an opposite direction of the Z-axis direction of the aggregate of battery cells 2), the heat dissipation member 4 and the plate member 5 are disposed in this order toward the opposite direction of the Z-axis direction in FIG. 1. As illustrated in FIG. 1, the heat dissipation member 4 and the plate member 5 may be disposed in this order on the first electrode 18a of the battery cell 18 with the electrode tab 3 interposed therebetween. On the second electrode 18b (in FIG. 1, the outside in the Z-axis direction of the aggregate of battery cells 2, the same holds true in the following description) of the battery cell 18, the heat dissipation member 4 and the plate member 5 are disposed in this order in the Z-axis direction in FIG. 1. As illustrated in FIG. 1, the heat dissipation member 4 and the plate member 5 may be disposed in this order on the second electrode 18b of the battery cell 18 with the electrode tab 3 interposed therebetween. As illustrated in FIG. 1, in the battery cell assembly 1, a circuit board 9 may be provided in the XZ-direction in FIG. 1.

Figure 5:
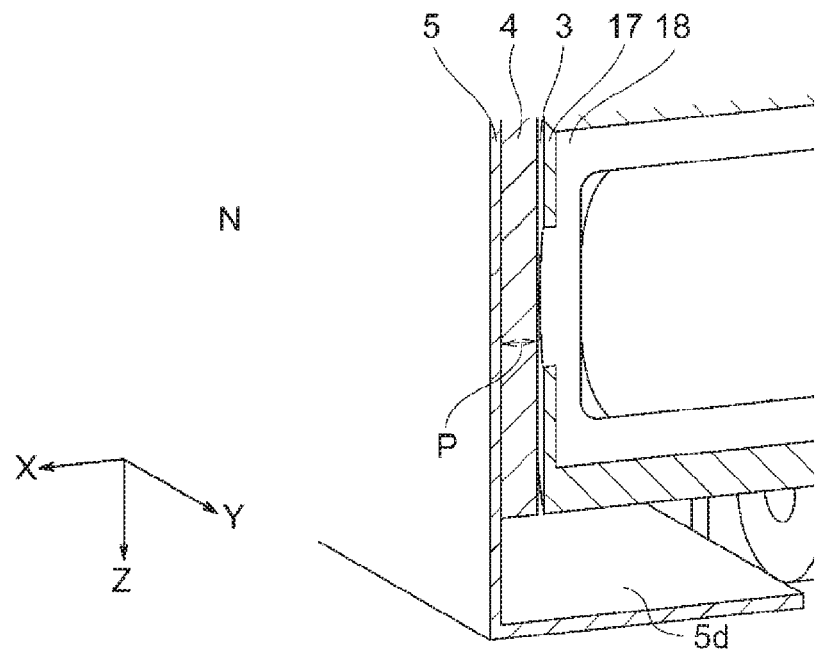
FIG. 5 is an enlarged sectional perspective view illustrating the battery cell assemblies included in the battery pack according to an embodiment of the present technology.

FIG. 5 is an enlarged sectional perspective view illustrating a portion N of the battery cell assembly 1 in FIG. 4. Referring to FIG. 5, the battery cell 18 (first electrode 18a), a battery cell holder 17, the electrode tab 3, the heat dissipation member 4, and the plate member 5 are disposed in this order in the X-axis direction in FIG. 5. As indicated by an arrow P in FIG. 5, the heat dissipation member 4 expands and contracts in substantially parallel to the X-axis in FIG. 5 when the battery cell assembly 1 is assembled in the tubular case 6. By the expansion and contraction, adhesion between the plate member 5 and the inside side surface 10 of the tubular case 6 is improved, and the battery pack 101 has the excellent heat dissipation.

The battery cell assembly 1 includes the aggregate of battery cells 2 including the plurality of battery cells 18. The aggregate of battery cells 2 may include the battery cell holder 17 that holds the plurality of battery cells 18. The battery cell assembly 1 may include at least one battery cell 18 instead of including the aggregate of battery cells 2 including the plurality of battery cells 18.

The battery cell 18 is not particularly limited, and a known battery can be used. Examples of the battery cell 18 include primary batteries such as a manganese dry battery, an alkaline manganese dry battery, and a lithium primary battery and secondary batteries such as a nickel-cadmium battery, a nickel-metal hydride battery, a nickel-zinc battery, a lead battery, a lithium secondary battery, a lithium ion secondary battery, and a lithium ion polymer secondary battery.

The battery pack 101 (battery cell assembly 1) includes two heat dissipation members 4. The battery pack 101 may have one heat dissipation member 4.

The heat dissipation member 4 may include any optional material as long as the material has the heat dissipation, and preferably the heat dissipation member 4 includes an elastic material. Examples of the elastic material include an elastomer, rubber, and a heat dissipation sheet of silicon or non-silicon.

Although the heat dissipation member 4 has a substantially rectangular sheet shape, the shape of the heat dissipation member 4 is not particularly limited as long as the heat dissipating property can be secured.

The battery pack 101 (battery cell assembly 1) includes two plate members 5. When the battery pack 101 (battery cell assembly 1) includes one heat dissipation member 4, the number of the plate members 5 is also changed according to the number of the heat dissipation members.

The plate member 5 may include any optional material, and preferably the plate member 5 includes a nonelastic material which is not elastically deformed. When the heat dissipation member 4 includes an insulating material, the plate member 5 may include a metal material. When the battery cell assembly 1 is assembled in the exterior case (tubular case 6), the plate member 5 prevents the heat dissipation member 4 from being bent or from being caught by the exterior case (tubular case 6), which allows the smooth assembly. The plate member 5 includes the nonelastic material, which allows the assembly to become smoother. The nonelastic material may be a crystalline or amorphous resin, and examples of the nonelastic material include polyolefin such as polyethylene and polypropylene, polyester, polyether, polyamide, polyurethane, and polyimide.

The shape of the plate member 5 is not particularly limited as long as the assembly is smoothly performed. As illustrated in FIGS. 1 and 2, preferably the plate member 5 includes surfaces 5a to 5d substantially perpendicular to the direction (the Z-axis direction in FIG. 2) in which the battery cell assembly 1 is assembled in the exterior case 6 (tubular case 6) at the end of the plate member 5.

The substantially perpendicular surfaces 5a and 5b include surfaces in the X-axis direction and the Y-axis direction in FIG. 2 so as to cover a part of the heat dissipation member 4, and the substantially perpendicular surfaces 5c and 5d include surfaces in an opposite direction of the X-axis direction in FIG. 2 and the Y-axis direction so as to cover a part of the heat dissipation member 4. The substantially perpendicular faces 5a to 5d may be formed as four separate surfaces at four ends of the two plate members 5 (on four short-side sides of the two plate members 5 in FIG. 1 or FIG. 2). In this case, the substantially perpendicular surfaces 5a and 5b are attached at the end on the short-side side of the plate 5 in the X-axis direction and the Y-axis direction in FIG. 2 so as to cover a part of the heat dissipation member 4. On the other hand, the substantially perpendicular faces 5c and 5d are attached at the end on the short-side side of the plate member 5 in the opposite direction of the X-axis direction in FIG. 2 and the Y-axis direction so as to cover a part of the heat dissipation member 4.

The substantially perpendicular surfaces 5a to 5d are formed by bending the two plate members 5 at, for example, approximately 90 degrees from the four ends (the four short-side sides of the two plate members 5 in FIG. 1 or FIG. 2) of the two plate members 5. In this case, the substantially perpendicular surfaces 5a and 5b are bent from the end of the plate member 5 in the X-axis direction in FIG. 2 so as to cover a part of the heat dissipation member 4. On the other hand, the substantially perpendicular surfaces 5c and 5d are bent from the end of the plate member 5 in the opposite direction of the X-axis direction in FIG. 2 so as to cover a part of the heat dissipation member 4.

The plate member 5 includes the substantially perpendicular surfaces 5a to 5d, which allows the assembly to become smoother.

As illustrated in FIG. 2, the exterior case included in the battery pack 101 is constructed with the tubular case 6 (the main body of the exterior case) and the top lid 7 (the top surface of the exterior case). The exterior case included in the battery pack 101 may be constructed with the tubular case and a bottom lid (the bottom surface of the exterior case). The tubular case 6 includes an opening 6a. In the battery pack 101, the battery cell assembly 1 is assembled in the opening 6a of the tubular case 6 in the Z-axis direction of FIG. 2, and the top lid 7 is attached to the opening 6a by a fastening screw in order to close the opening 6a of the tubular case 6 after the assembly.

The tubular case 6 may include at least a surface opposed to a main surface 51 of the plate member 5. That is, the tubular case 6 may include at least one surface opposed to the main surface 51 of the plate member 5 when the battery pack 101 includes one plate member 5, and the tubular case 6 may include at least two surfaces opposed to the main surface 51 of the plate member 5 when the battery pack 101 includes two plate members 5. In the case that the battery pack 101 includes the two plate members 5, for the purpose of shape stability of the tubular case 6, the tubular case 6 may include at least two surfaces opposed to the main surfaces 51 of the two plate members 5 and a surface connecting the two surfaces. Preferably the tubular case 6 is an integrally molded product, and preferably the tubular case 6 does not include an interface that separates the tubular case 6 into at least two.

The tubular case 6 (the main body of the exterior case) may contain any optional material, but preferably the tubular case 6 contains a material having the heat dissipation. When the tubular case 6 contains the material having the heat dissipation, sometimes a heat transfer path (for example, an opening) or the like that dissipates the heat to the outside air need not to be provided in the tubular case 6. Examples of the material having the heat dissipation include resin materials such as a thermally conductive resin and metallic materials such as an aluminum alloy and a magnesium alloy. The top lid 7 (the top surface of the exterior case) may also contain any optional material. The top lid 7 may be formed of the same material as the tubular case 6 or a material different from the tubular case 6.

Heat dissipation grease 11 will be described with reference to FIGS. 2 and 3. As illustrated in FIGS. 2 and 3, the heat dissipation grease 11 may be used for the battery pack 101. The heat dissipation grease 11 is applied to the main surface 51 (heat conductive surface) of the plate member 5 opposed to the inner wall surface 10 of the tubular case 6. An application amount of the heat dissipation grease 11 may be a whole of the main surface 51 of the plate member 5 or a part of the main surface 51. The heat dissipation grease 11 may be applied to the main surfaces 51 of the two plate members 5 or one of the main surfaces 51 of the two plate members 5. By applying the heat dissipation grease 11 to the main surface 51 of the plate member 5, the adhesion between the plate member 5 and the tubular case 6 is further improved, the gap can further be decreased at the interface between the plate member 5 and the tubular case 6, and the heat dissipation can further be improved.

The heat dissipation grease 11 is not particularly limited as long as the heat dissipation grease 11 has heat dissipating and a coating physical property. Heat dissipation grease X-23-8033-1 (product of Shin-Etsu Chemical Co., Ltd.) can be cited as an example. A heat dissipation gap filler, which is cured into a sheet shape from a grease state at the time of coating, can also be cited as the heat dissipation grease 11.

Figure 6:
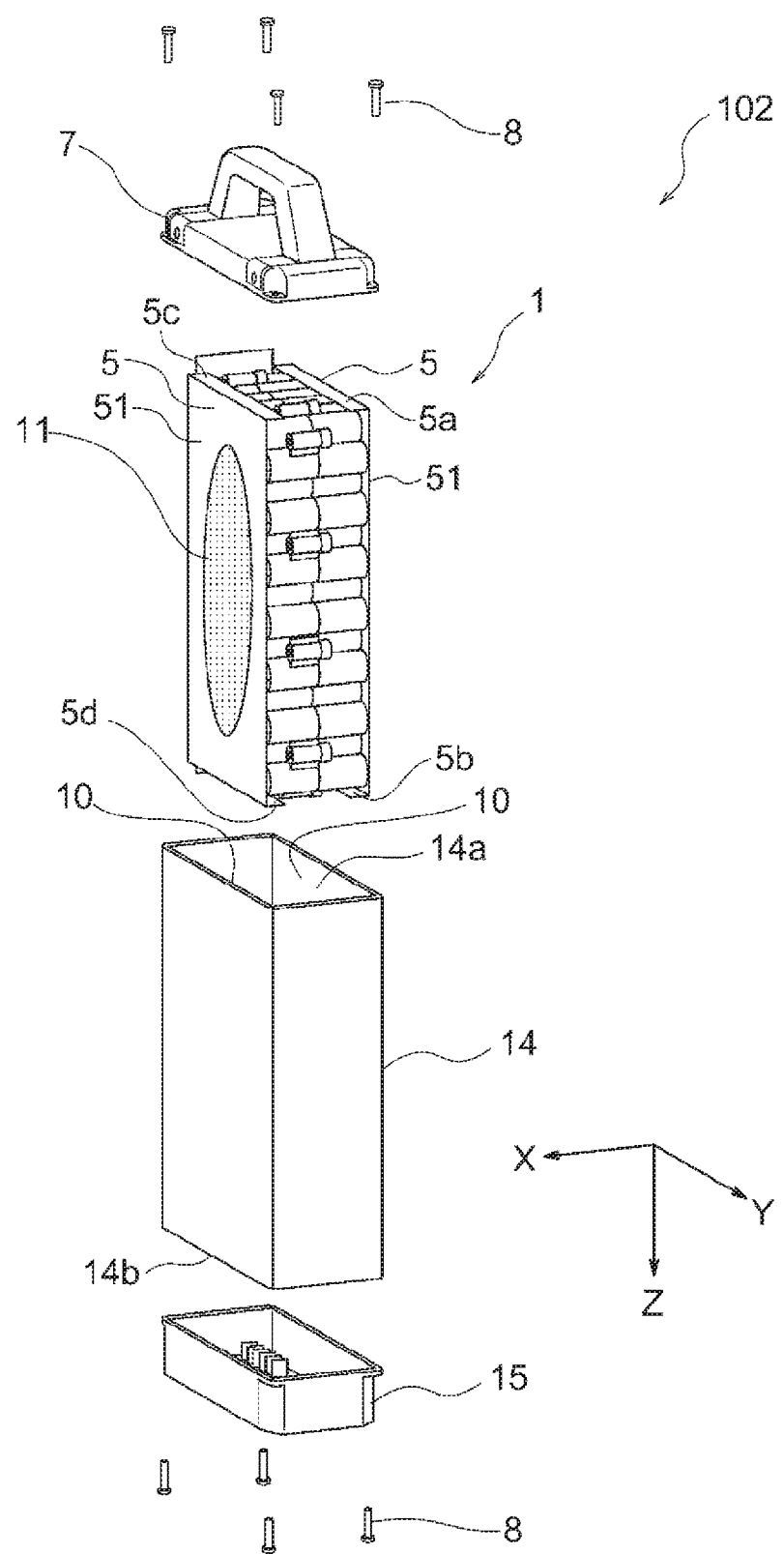
FIG. 6 is an exploded perspective view illustrating the battery pack according to an embodiment of the present technology.

A battery pack 102 of a second embodiment (a first modification of the battery pack) according to the present technology will be described with reference to FIGS. 1 and 6. FIG. 6 is an exploded perspective view of the battery pack 102. The battery cell assembly 1 included in the battery pack 102 is described above in the section on [2-2. Battery cell assembly] with reference to FIG. 1.

As illustrated in FIGS. 1 and 6, the battery pack 102 includes the battery cell assembly 1, a tubular case 14 (the main body of the exterior case), the top lid 7 (the top surface of the exterior case), and a bottom lid 15 (the bottom surface of the exterior case). In the battery pack 102, along the direction (the Z-axis direction in FIG. 6) in which the battery cell assembly 1 is assembled in the exterior case (tubular case 14), the heat dissipation member 4 and the plate member 5 are disposed in this order on each of the first electrode 18a and the second electrode 18b of the battery cell 18.

Similarly to the battery pack 101, because the plate member 5 and the inside side surface 10 of the tubular case 14 contact closely with each other by the elastic action of the heat dissipation member 4, which is included in the battery cell assembly 1 and assembled in the tubular case 14, the heat generation of the battery cell 18 is efficiently transferred to the tubular case 14, and the heat dissipation of the battery pack 102 is improved.

Similarly to the battery pack 101, when the tubular case 14 included in the battery pack 102 is manufactured, for example, by integral molding and has no interface, two electrode surfaces of the aggregate of battery cells 2 (the electrode tab welding surface in the case of including the electrode tab 3) can uniformly covered, so that the individual temperature of each of the plurality of battery cells 18 can be uniformized. As a result, local performance degradation of the plurality of battery cells 18 is prevented, a life of the battery cells 18 is lengthened, and the battery characteristic or reliability of the battery pack 102 is improved.

In the battery pack 102 (battery cell assembly 1), at least one heat dissipation member may be disposed in a surface (the XY-direction in FIG. 6) substantially perpendicular to the direction (the Z-axis direction in FIG. 6) in which the battery cell assembly 1 is assembled in the tubular case 14. In this case, the heat transfer path is further increased in the battery pack 102, so that the heat dissipation of the battery pack 102 can further be improved.

As illustrated in FIG. 6, the exterior case included in the battery pack 102 is constructed with the tubular case 14 (the main body of the exterior case), the top lid 7 (the top surface of the exterior case), and the bottom lid 15 (the bottom surface of the exterior case). The tubular case 14 includes an upper opening 14a and a bottom opening 14b. In the battery pack 102, the battery cell assembly 1 is assembled in the opening 14a of the tubular case 14 in the Z-axis direction of FIG. 6, the top lid 7 is attached to the opening 14a by a fastening screw 8 in order to close the opening 14a of the tubular case 14 after the assembly, and the bottom lid 15 is attached to the opening 14b by the fastening screw 8 in order to close the opening 14b of the tubular case 14. The tubular case 14 may include at least a surface (such as an inner wall surface) opposed to the main surface of the plate member 5. That is, the tubular case 14 may include at least one surface opposed to the main surface of the plate member 5 when the battery pack 102 includes one plate member 5, and the tubular case 14 may include at least two surfaces opposed to the main surface of the plate member 5 when the battery pack 102 includes two plate members 5. In the case that the battery pack 102 includes the two plate members 5, for the purpose of the shape stability of the tubular case 14, the tubular case 14 may include at least two surfaces opposed to the main surfaces of the two plate members 5 and the surface connecting the two surfaces. Preferably the tubular case 14 is an integrally molded product, and preferably the tubular case 14 does not include an interface that separates the tubular case 14 into at least two.

The tubular case 14 (the main body of the exterior case) may contain any optional material, but preferably the tubular case 14 contains a material having the heat dissipation. When the tubular case 14 contains the material having the heat dissipation, the heat transfer path (for example, the opening) or the like that dissipates the heat to the outside air need not to be provided in the tubular case 14. Examples of the material having the heat dissipation include resin materials such as a thermally conductive resin and metallic materials such as an aluminum alloy and a magnesium alloy. The top lid 7 (the top surface of the exterior case) and the bottom lid 15 (the bottom surface of the exterior case) may also contain any optional material. For example, the top lid 7 and/or the bottom lid 15 may be made of the same material as the tubular case 14 or a material different from the tubular case 14.

Items except for the description relating to the battery cell 18, the heat dissipation member 4, and the plate member 5, which are included in the battery pack 102, are identical to those described in [2-3. Battery cell], [2-4. Heat dissipation member], and [2-5. Plate member], so that the description is omitted. Similarly, items relating to the heat dissipation grease 11 that may be included in the battery pack 102 are described in [2-7. Heat dissipation grease], the description is omitted.

Figure 7:
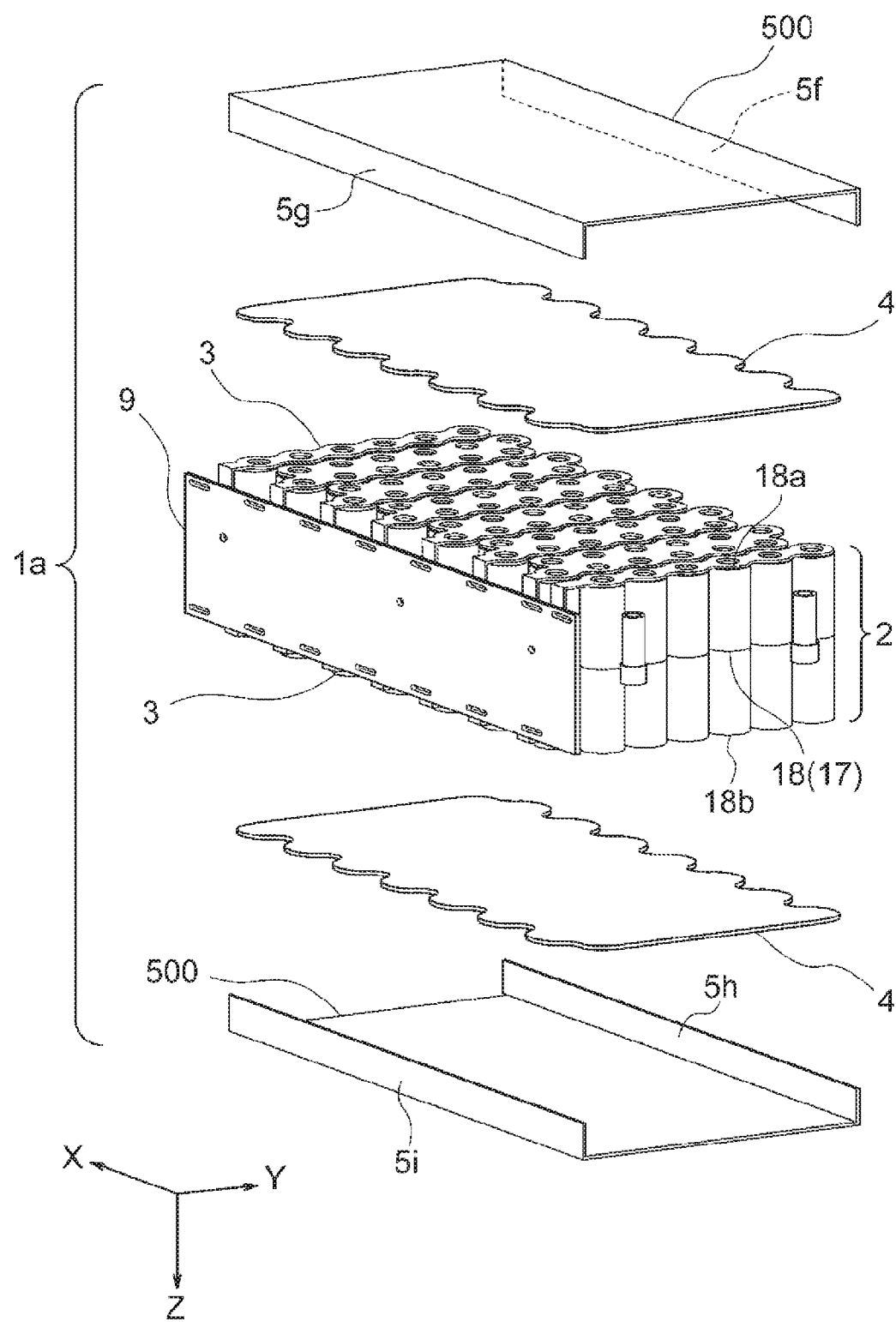
FIG. 7 is an exploded perspective view illustrating the battery cell assembly included in the battery pack according to an embodiment of the present technology.
Figure 8:
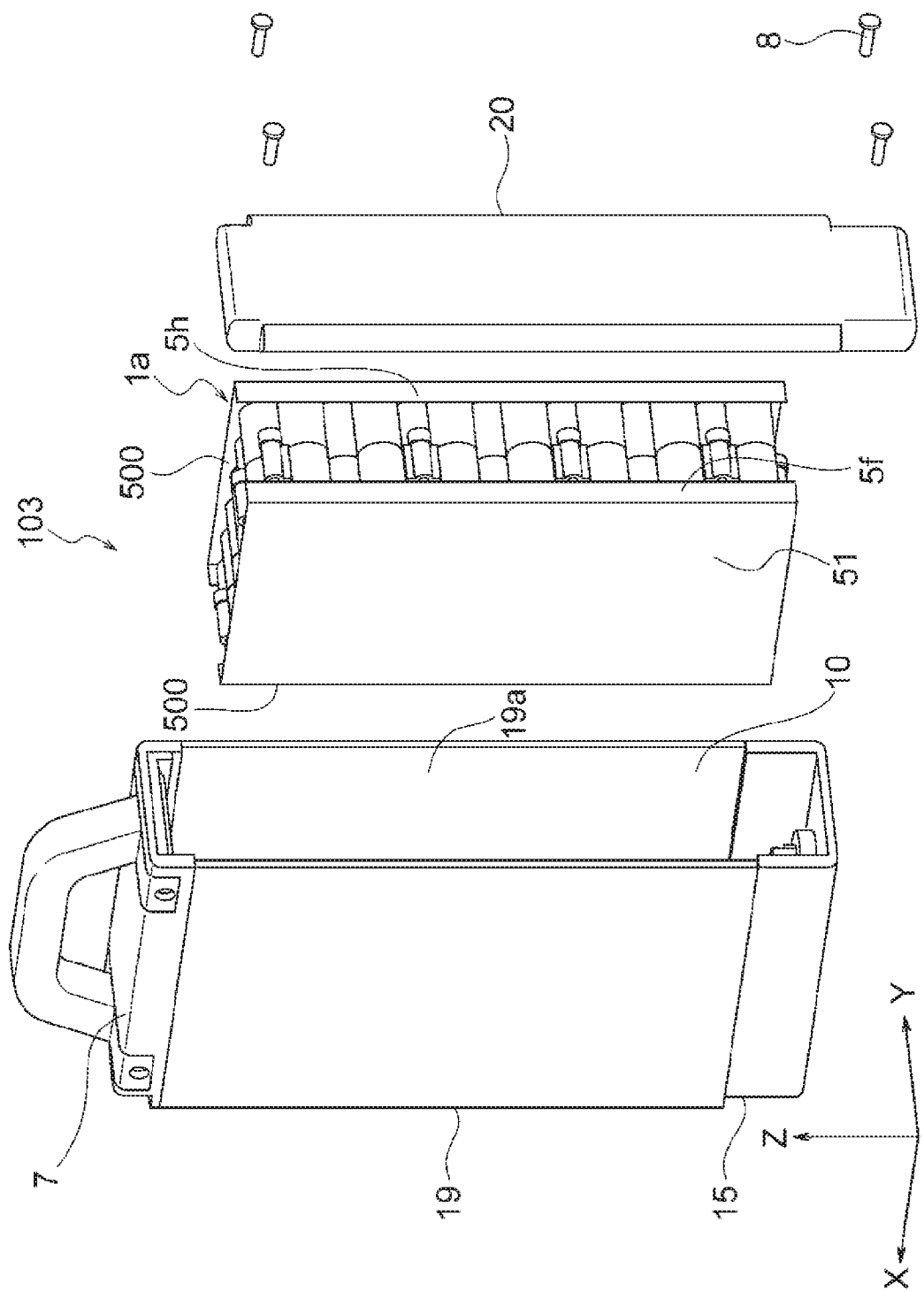
FIG. 8 is an exploded perspective view illustrating the battery pack according to an embodiment of the present technology.

A battery pack 103 of a third embodiment (a second modification of the battery pack) according to the present technology will be described with reference to FIGS. 7 and 8. FIG. 7 is an exploded perspective view of a battery cell assembly 1a. FIG. 8 is an exploded perspective view of a battery pack 103.

As illustrated in FIGS. 7 and 8, the battery pack 103 includes at least the battery cell assembly 1a including the aggregate of battery cells 2 including the plurality of battery cells 18, two heat dissipation members 4, and two plate members 500 and the exterior case constructed with a main body 19 (that may be referred to as a tubular case 19) of the exterior case, the top lid 7 (the upper surface of the exterior case), the bottom lid 15 (the bottom surface of the exterior case), and a side surface lid 20 (a side surface of the exterior case). In the battery pack 103, along the direction (the X-axis direction in FIG. 8) in which the battery cell assembly 1a is assembled in the exterior case (the main body 19 of the exterior case), the heat dissipation member 4 and the plate member 500 are disposed in this order on each of the first electrode 18a and the second electrode 18b of the battery cell 18.

Similarly to the battery pack 101, because the plate member 500 and the inside side surface 10 of the main body 19 of the exterior case contact closely with each other by the elastic action of the heat dissipation member 4, which is included in the battery cell assembly 1a and assembled in the main body 19 of the exterior case, the heat generation of the battery cell 18 is efficiently transferred to the main body 19 of the exterior case, and the heat dissipation of the battery pack 103 is improved.

Similarly to the battery pack 101, when the main body 19 of the exterior case included in the battery pack 103 is manufactured, for example, by integral molding and has no interface, two electrode surfaces of the aggregate of battery cells 2 (the electrode tab welding surface in the case of including the electrode tab 3) can uniformly covered, so that the individual temperature of each of the plurality of battery cells 18 can be uniformized. As a result, local performance degradation of the plurality of battery cells 18 is prevented, the life of the battery cells 18 is lengthened, and the battery characteristic or reliability of the battery pack 103 is improved.

In the battery pack 103 (battery cell assembly 1a), at least one heat dissipation member may be disposed in the surface (a YZ-direction in FIG. 8) substantially perpendicular to the direction (the X-axis direction in FIG. 8) in which the battery cell assembly 1a is assembled in the main body 19 of the exterior case. In this case, the heat transfer path is further increased in the battery pack 103, so that the heat dissipation of the battery pack 103 can further be improved.

The battery cell assembly 1a included in the battery pack 103 will be described in detail with reference to FIG. 7.

As described above, the battery cell assembly 1a includes at least the aggregate of battery cells 2 including the plurality of battery cells 18, the two heat dissipation members 4, and the two plate members 500. On the first electrode 18a of the battery cell 18 (in FIG. 7, an outside in an opposite direction of the Z-axis direction of the aggregate of battery cells 2), the heat dissipation member 4 and the plate member 500 are disposed in this order toward the opposite direction of the Z-axis direction in FIG. 7. As illustrated in FIG. 7, the heat dissipation member 4 and the plate member 500 may be disposed in this order on the first electrode 18a of the battery cell 18 with the electrode tab 3 interposed therebetween. On the second electrode 18b (in FIG. 7, the outside in the Z-axis direction of the aggregate of battery cells 2) of the battery cell 18, the heat dissipation member 4 and the plate member 500 are disposed in this order in the Z-axis direction in FIG. 7. As illustrated in FIG. 7, the heat dissipation member 4 and the plate member 500 may be disposed in this order on the second electrode 18b of the battery cell 18 with the electrode tab 3 interposed therebetween. As illustrated in FIG. 7, in the battery cell assembly 1a, the circuit board 9 may be provided in the XZ-direction in FIG. 7.

Similarly to the battery assembly 1 in FIG. 5, the heat dissipation member 4 included in the battery assembly 1a expands and contracts when the battery cell assembly 1a is assembled in the main body 19 of the exterior case. By the expansion and contraction, the adhesion between the plate member 500 and the inside side surface 10 of the main body 19 of the exterior case is improved, and the battery pack 103 has the excellent heat dissipation.

The battery pack 103 (battery cell assembly 1a) includes two plate members 500. When the battery pack 103 (battery cell assembly 1a) includes one heat dissipation member 4, the number of the plate members 500 is also changed according to the number of the heat dissipation members.

The plate member 500 may include any optional material, and preferably the plate member 500 includes a nonelastic material which is not elastically deformed. When the heat dissipation member 4 includes an insulating material, the plate member 500 may include a metal material. When the battery cell assembly 1a is assembled in the exterior case (the main body 19 of the exterior case), the plate member 500 prevents the heat dissipation member 4 from being bent or from being caught by the exterior case (the main body 19 of the exterior case), which allows the smooth assembly. The plate member 500 includes the nonelastic material, which allows the assembly to become smoother. The nonelastic material may be a crystalline or amorphous resin, and examples of the nonelastic material include polyolefin such as polyethylene and polypropylene, polyester, polyether, polyamide, polyurethane, and polyimide.

The shape of the plate member 500 is not particularly limited as long as the assembly is smoothly performed. As illustrated in FIGS. 7 and 8, preferably the plate member 500 includes surfaces 5f to 5i substantially perpendicular to the direction (the X-axis direction in FIG. 8) in which the battery cell assembly 1a is assembled in the exterior case (the main body 19 of the exterior case) at the end of the plate member 500.

The substantially perpendicular surfaces 5f and 5g include surfaces in the Y-axis direction and the Z-axis direction in FIG. 8 so as to cover a part of the heat dissipation member 4, and the substantially perpendicular surfaces 5h and 5i include surfaces in an opposite direction of the Y-axis direction in FIG. 8 and the Z-axis direction so as to cover a part of the heat dissipation member 4. The substantially perpendicular faces 5f to 5i may be formed as four separate surfaces at four ends of the two plate members 500 (on four long-side sides of the two plate members 500 in FIG. 7 or FIG. 8). In this case, the substantially perpendicular surfaces 5f and 5g are attached at the end on the long-side side of the plate member 500 in the Y-axis direction and the Z-axis direction in FIG. 8 so as to cover a part of the heat dissipation member 4. On the other hand, the substantially perpendicular faces 5h and 5i are attached at the end on the long-side side of the plate member 500 in the opposite direction of the Y-axis direction in FIG. 8 and the Z-axis direction so as to cover a part of the heat dissipation member 4.

The substantially perpendicular surfaces 5f to 5i are formed by bending the two plate members 500 at, for example, approximately 90 degrees from the four ends (the four long-side sides of the two plate members 500 in FIG. 7 or FIG. 8) of the two plate members 500. In this case, the substantially perpendicular surfaces 5f and 5g are bent from the end of the plate member 500 in the Y-axis direction in FIG. 8 so as to cover a part of the heat dissipation member 4. On the other hand, the substantially perpendicular surfaces 5h and 5i are bent from the end of the plate member 500 in the opposite direction of the Y-axis direction in FIG. 8 so as to cover a part of the heat dissipation member 4.

The plate member 500 includes the substantially perpendicular surfaces 5f to 5i, which allows the assembly to become smoother.

As illustrated in FIG. 8, the exterior case included in the battery pack 103 is constructed with the main body 19 of the exterior case, the top lid 7 (the top surface of the exterior case), the bottom lid 15 (the bottom surface of the exterior case), and the side surface lid 20 (the side surface of the exterior case). The main body 19 of the exterior case includes an opening 19a on the side surface. In the battery pack 103, the battery cell assembly 1a is assembled in the opening 19a of the main body 19 of the exterior case in the X-axis direction of FIG. 8, and the side surface lid 20 is attached to the opening 19a by the fastening screw 8 in order to close the opening 19a of the main body 19 of the exterior case after the assembly. The main body 19 of the exterior case may include at least a surface (such as an inner wall surface) opposed to the main surface of the plate member 500. That is, the main body 19 of the exterior case may include at least one surface opposed to the main surface of the plate member 500 when the battery pack 103 includes one plate member 500, and the main body 19 of the exterior case may include at least two surfaces opposed to the main surface of the plate member 500 when the battery pack 103 includes two plate members 500. In the case that the battery pack 103 includes the two plate members 500, for the purpose of the shape stability of the main body 19 of the exterior case, the main body 19 of the exterior case may include at least two surfaces opposed to the main surfaces of the two plate members 500 and the surface connecting the two surfaces. Preferably the main body 19 of the exterior case is an integrally molded product, and preferably main body 19 of the exterior case does not include the interface that separates the main body 19 of the exterior case into at least two.

The main body 19 of the exterior case may contain any optional material, but preferably the main body 19 of the exterior case contains a material having the heat dissipation. When the main body 19 of the exterior case contains the material having the heat dissipation, the heat transfer path (for example, the opening) or the like that dissipates the heat to the outside air need not to be provided in the main body 19 of the exterior case. Examples of the material having the heat dissipation include resin materials such as a thermally conductive resin and metallic materials such as an aluminum alloy and a magnesium alloy. The top lid 7 (the upper surface of the exterior case), the bottom lid 15 (the bottom surface of the exterior case), and the side surface lid 20 (the side surface of the exterior case) may also contain any optional material. For example, the top lid 7, the bottom lid 15 and/or the side surface lid 20 may be made of the same material as the main body 19 of the exterior case or a material different from the main body 19 of the exterior case.

Items except for the description relating to the battery cell 18 and the heat dissipation member 4, which are included in the battery pack 103, are identical to those described in [2-3. Battery cell] and [2-4. Heat dissipation member], so that the description is omitted. Similarly, items relating to the heat dissipation grease that may be included in the battery pack 103 are described in [2-7. Heat dissipation grease], the description is omitted.

Figure 9:
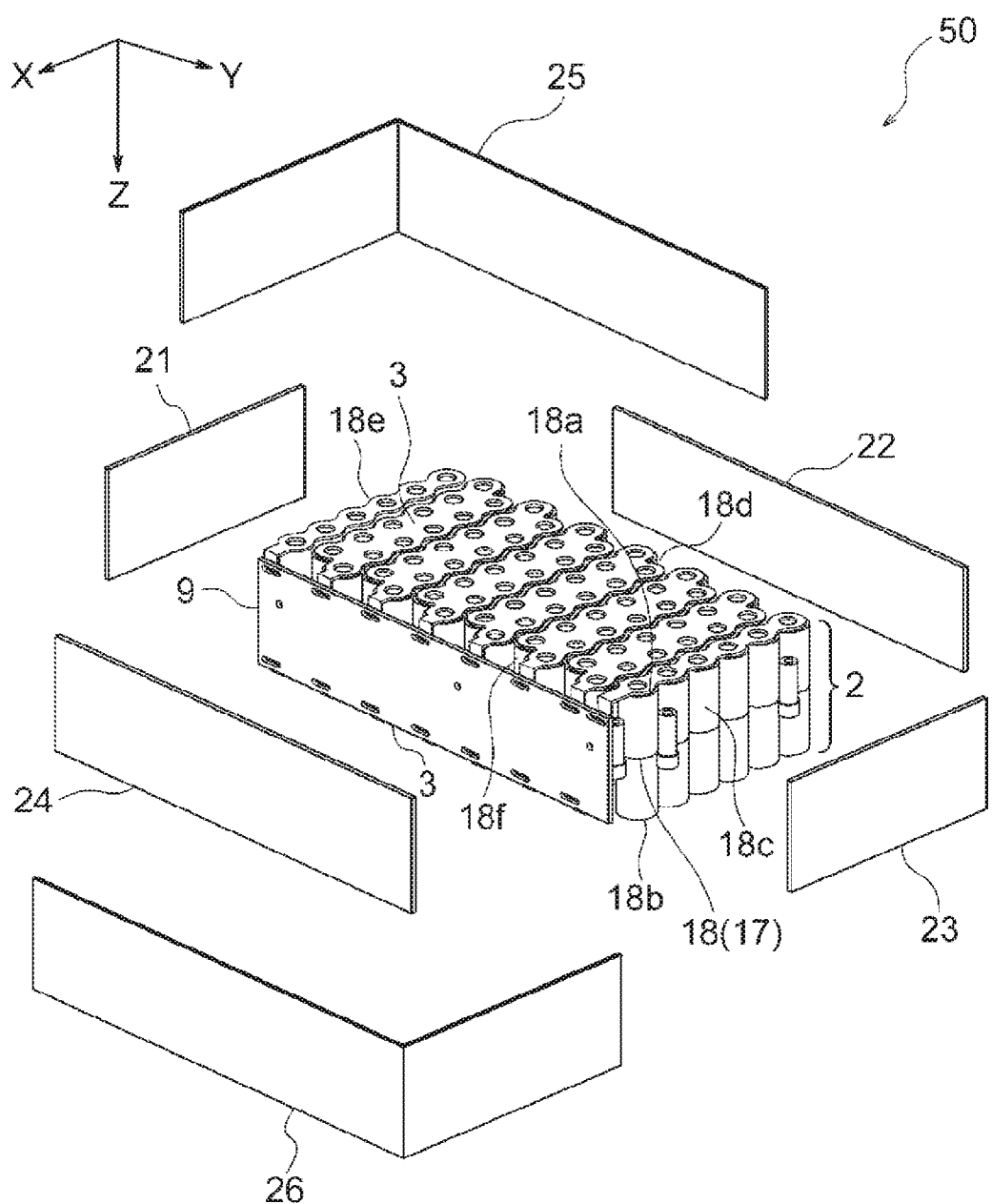
FIG. 9 is an exploded perspective view illustrating a battery cell assembly included in a battery pack according to an embodiment of the present technology.
Figure 10:
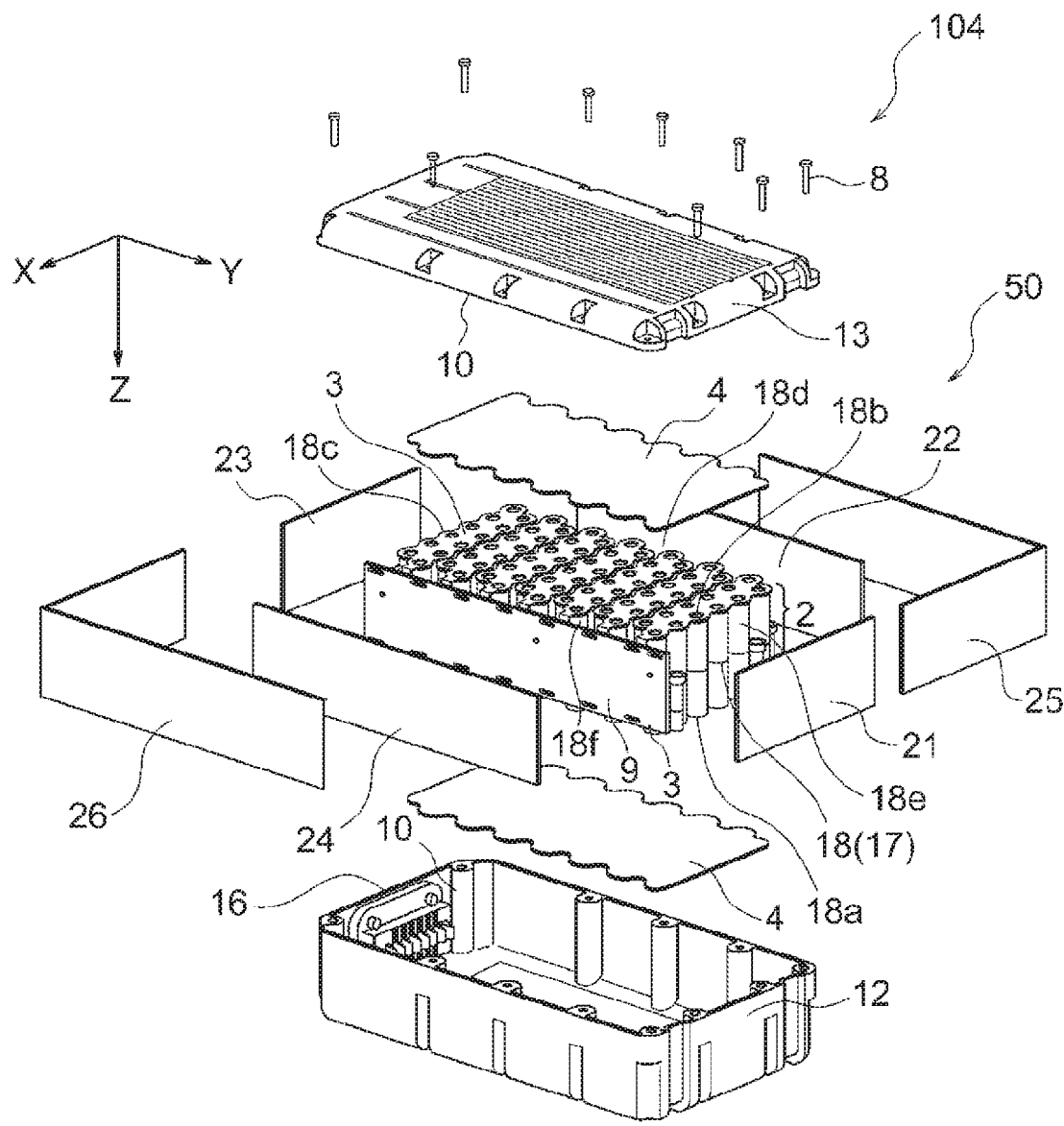
FIG. 10 is an exploded perspective view illustrating a battery pack according to an embodiment of the present technology.

A battery pack 104 of a fourth embodiment (a third modification of the battery pack) according to the present technology will be described with reference to FIGS. 9 and 10. FIG. 9 is an exploded perspective view of a battery cell assembly 50. FIG. 10 is an exploded perspective view of the battery pack 104.

As illustrated in FIGS. 9 and 10, the battery pack 104 includes at least the battery cell assembly 50 including the aggregate of battery cells 2 including the plurality of battery cells 18, four heat dissipation members 21 to 24, and two plate members 25 and 26 and the exterior case constructed with the exterior half body lower case 12 and the exterior half body upper case 13. In order to further improve the heat dissipation, as illustrated in FIG. 10, the two heat dissipation members 4 may be disposed in the battery pack 104 with the electrode tab 3 interposed therebetween on each of the first electrode 18a and the second electrode 18b of the battery cell 18 in the direction (the X-axis direction and the Y-axis direction in FIG. 10) perpendicular to the direction (the Z-axis direction in FIG. 10) in which the exterior half body upper case 13, the battery cell assembly 2, and the exterior half body lower case 12 are laminated and assembled. In the battery pack 104, along the direction (the Z-axis direction in FIG. 10) in which the battery cell assembly 50, the exterior half body lower case 12, and the exterior half body upper case 13 are assembled (laminated), the heat dissipation members 21 and 22 and the plate member 25 are disposed in this order on side surfaces 18c to 18f (four side surfaces of the aggregate of battery cells 2) of the battery cell 18, and the heat dissipation members 23 and 24 and the plate member 26 are disposed in this order. In FIGS. 9 and 10, the four side surfaces of the aggregate of battery cells 2 are constructed with two surfaces in the X-axis and Z-axis directions and two surfaces in the Y-axis and Z-axis directions.

Similarly to the battery pack 101, the plate members 25 to 26 and the inner side surfaces 10 of the exterior half body upper case 13 and the exterior half body lower case 12 contact closely with each other by the elastic action of the heat dissipation members 21 to 24, which are included in the battery cell assembly 50 and assembled in the exterior half body upper case 13 and the exterior half body lower case 12, the heat generation of the battery cell 18 is efficiently transmitted to the exterior half body upper case 13 and the exterior half body lower case 12, and the heat dissipation of the battery pack 104 is improved.

As described above, the battery pack 104 further includes the two heat dissipation members 4, so that the heat dissipation path of the battery pack 104 can further be increased to improve the heat dissipation.

The four heat dissipation members 21 to 24 can uniformly cover the side surface portions 18c to 18f of the plurality of battery cells 18, and the two heat dissipation members 4 can uniformly cover the electrode surfaces (the electrode tab welding surface in the case of including the electrode tab 3) constructed with the first electrodes 18a or the second electrode 18b of the plurality of battery cells 18, so that the individual temperature of each of the plurality of battery cells 18 can be uniformized. As a result, local performance degradation of the plurality of battery cells 18 is prevented, the life of the battery cells 18 is lengthened, and the battery characteristic or reliability of the battery pack 104 is improved.

The battery cell assembly 50 provided in the battery pack 104 will be described in detail with reference to FIG. 9.

As described above, the battery cell assembly 50 includes at least the aggregate of battery cells 2 including the plurality of battery cells 18, the heat dissipation members 21 to 24, and the plate members 25 to 26, the electrode tab 3 is disposed on the first electrode 18a, and the electrode tab 3 is disposed on the second electrode 18b.

On the side surface 18c (the side surface in the X-axis direction and the Z-axis direction of the aggregate of battery cells 2) of the battery cell 18, the heat dissipation member 23 and the plate member 26 are disposed in this order in the Y-axis direction of FIG. 9. On the side surface 18f (the side surface in the Y-axis direction and the Z-axis direction of the aggregate of battery cells 2) of the battery cell 18, the heat dissipation member 24 and the plate member 26 are disposed in this order in the X-axis direction of FIG. 9. As illustrated in FIG. 9, the heat dissipation member 24 and the plate member 26 may be disposed in this order with the circuit board 9 interposed therebetween.

On the side surface 18e (the side surface in the X-axis direction and the Z-axis direction of the aggregate of battery cells 2) of the battery cell 18, the heat dissipation member 21 and the plate member 25 are disposed in this order in the opposite direction of the Y-axis direction in FIG. 9. On the side surface 18d (the side surface in the Y-axis direction and the Z-axis direction of the aggregate of battery cells 2) of the battery cell 18, the heat dissipation member 22 and the plate member 25 are disposed in this order in the opposite direction of the X-axis direction in FIG. 9.

The battery pack 104 (battery cell assembly 50) includes the four heat dissipation members 21 to 24. The battery pack 104 may include at least one of the four heat dissipation members 21 to 24.

Items except for the description relating to the heat dissipation members 21 to 24 are identical to those described in [2-4. Heat dissipation member], so that the description is omitted.

The battery pack 104 (battery cell assembly 50) has two plate members 25 to 26. When the battery pack 104 (battery cell assembly 50) includes at least one of the four heat dissipation members 21 to 24, the number of the plate members 25 and 26 is also changed according to the number of the heat dissipation members.

The plate members 25 and 26 may include any optional material, and preferably the plate members 25 and 26 include a nonelastic materials that is not elastically deformed. When the heat dissipation members 21 to 24 include an insulating material, the plate members 25 and 26 may contain a metal material. When the battery cell assembly 50 is assembled in the exterior case (the exterior half body lower case 12 and the exterior half body upper case 13), the plate members 25 and 26 prevent the heat dissipation members 21 to 24 from being bent or from being caught by the exterior case (the exterior half body lower case 12 and the exterior half body upper case 13), which allows the smooth assembly. The plate members 25 and 26 include the nonelastic material, which allows the assembly to become smoother. The nonelastic material may be a crystalline or amorphous resin, and examples of the nonelastic material include polyolefin such as polyethylene and polypropylene, polyester, polyether, polyamide, polyurethane, and polyimide.

The shapes of the plate members 25 and 26 are not particularly limited as long as the assembly can smoothly be performed. As illustrated in FIGS. 9 and 10, preferably a surface in the X-axis direction and the Z-axis direction and a surface in the Y-direction and the Z-axis direction are connected to each other in the plate member 25. The assembly becomes further smooth by the preferable mode. In the plate member 25, the surface in the X-axis direction and the Z-axis direction and the surface in the Y-axis direction and the Z-axis direction may be independent of each other. As illustrated in FIGS. 9 and 10, preferably a surface in the X-axis direction and the Z-axis direction and a surface in the Y-axis direction and the Z-axis direction are connected to each other in the plate member 26. The assembly becomes further smooth by the preferable mode. In the plate 26, the surface in the X-axis direction and Z-axis direction and the surface in the Y-axis direction and the Z-axis direction may be independent of each other. Although not illustrated in FIGS. 9 and 10, the plate members 25 and 26 may include at least one surface (a surface having the X-axial direction and the Y-axis direction) substantially perpendicular to the direction (the Z-axis direction in FIG. 9) in which the exterior half body upper case 13, the battery cell assembly 2, and the exterior half body lower case 12 are stacked and assembled in this order at the ends (the short-side side and/or the long-side side) of the plate members 25 and 26 similarly to the plate members 5 and/or 500.

As illustrated in FIG. 10, the exterior case included in the battery pack 104 is constructed with the exterior half body lower case 12 and the exterior half body upper case 13. The exterior half body upper case 13, the heat dissipation member 4, the battery cell assembly 50, the heat dissipation member 4, and the exterior half body lower case 12 are laminated and assembled in this order in the Z-axis direction of FIG. 10, and the exterior half body lower case 12 and the exterior half body upper case 13 are attached by the fastening screw 8, and preparing the battery pack 104.

The exterior half body lower case 12 and the exterior half body upper case 13 may contain any optional material, and preferably the exterior half body lower case 12 and the exterior half body upper case 13 contain the material having the heat dissipation. When the exterior half body lower case 12 and the exterior half body upper case 13 contain the material having the heat dissipation, sometimes the heat transfer path (for example, the opening) or the like that dissipates the heat to the outside air need not to be provided in the exterior half body lower case 12 and the exterior half body upper case 13. Examples of the material having the heat dissipation include resin materials such as a thermally conductive resin and metallic materials such as an aluminum alloy and a magnesium alloy. The exterior half body lower case 12 and the exterior half body upper case 13 may be made of the identical material or different materials.

Items except for the description relating to the battery cell 18, which is included in the battery pack 104, are identical to those described in [2-3. Battery cell], so that the description is omitted. Similarly, items relating to the heat dissipation grease that may be included in the battery pack 104 are described in [2-7. Heat dissipation grease], the description is omitted.

The application of the battery pack will be described in detail below.

The application of the battery pack is not particularly limited as long as the application is a machine, an instrument, a tool, a device, and a system (an aggregate of a plurality of instruments and the like) in which the battery pack can be used as a driving power supply or a power storage source for accumulating electric power.

The battery pack used as a power supply may be a main power supply (power supply used preferentially) or an auxiliary power supply (power supply used instead of the main power supply or switched from the main power supply). When the battery pack is used as the auxiliary power supply, a type of the main power supply is not limited to the battery pack.

For example, the application of the battery pack is as follows. Examples of the application of the battery pack include electronic devices (including a portable electronic device) such as a notebook type personal computer, a tablet type computer, a mobile phone (such as a smart phone), a Personal Digital Assistant (PDA), an imaging device (such as a digital still camera and a digital video camera), an audio device (such as a portable audio player), a game machine, a cordless phone slave device, an electronic book, an electronic dictionary, a radio, a headphone, a navigation system, a memory card, a pacemaker, a hearing aid, a lighting device, a toy, a medical device, and a robot. Examples of the application of the battery pack include portable life instruments such as an electric shaver. Examples of the application of the battery pack include storage devices such as a backup power supply and a memory card. Examples of the application of the battery pack include electric tools such as an electric drill and an electric saw. Examples of the application of the battery pack include medical electronic devices such as a pacemaker and a hearing aid. Examples of the application of the battery pack include vehicles used for an electric automobile (including a hybrid automobile) and the like. Examples of the application of the battery pack include power storage systems such as a household battery system that stores the electric power in preparation for emergency. The battery pack may be used in applications other than the above applications.

Among others, the battery pack is effectively applied to the vehicle, the power storage system, the electric tool, and the electronic device. Because excellent battery characteristic is required for the battery pack, the improvement of the performance can effectively be achieved using the battery pack of the present technology. The battery pack is a power supply in which a battery such as a lithium ion secondary battery is used, and is what is called an assembled battery. For example, as described above, the battery pack is used for a notebook type personal computer or the like as a detachable power supply. The vehicle is a vehicle that operates (travels) with the battery pack as the driving power supply, and as described above, the vehicle may be an automobile (such as the hybrid automobile) including a driving source except for the battery pack. A residential power storage system can be cited as an example of the power storage system, and the power storage system is a system in which the battery pack as the power storage source. In the power storage system, the electric power is stored in the battery pack that is the power storage source, so that an electric power consumption device, for example, a household electric appliance can be used using the electric power. The power tool is a tool in which a movable unit (such as a drill) is movable using the battery pack as a driving power supply. The electronic device is a device that exerts various functions with the battery pack as the driving power supply (power supply source).

Some application examples of the battery pack according to the present technology will specifically be described. Because the configuration of each application example described below is merely an example, the configuration can appropriately be changed.

A vehicle of a fifth embodiment according to the present technology includes the battery pack of the present technology, a driving force converting device (a drive force converter) that receives electric power from the battery pack and converts the electric power into drive force of the vehicle, a drive unit (driver) that drives the vehicle according to the drive force, and a vehicle control device. The vehicle of the fifth embodiment according to the present technology may include the battery pack of the first embodiment according to the present technology, the battery pack of the second embodiment according to the present technology, the battery pack of the third embodiment according to the present technology, or the battery pack of the fourth embodiment according to the present technology, the driving force converting device that receives the electric power from the battery pack and converts the electric power into the drive force of the vehicle, the drive unit that drives the vehicle according to the drive force, and the vehicle control device. The vehicle of the fifth embodiment according to the present technology includes the battery pack of the present technology having the excellent heat dissipation and reliability, so that the performance of the vehicle can be improved.

The vehicle of the fifth embodiment according to the present technology will be described below with reference to FIG. 12.

Figure 12:
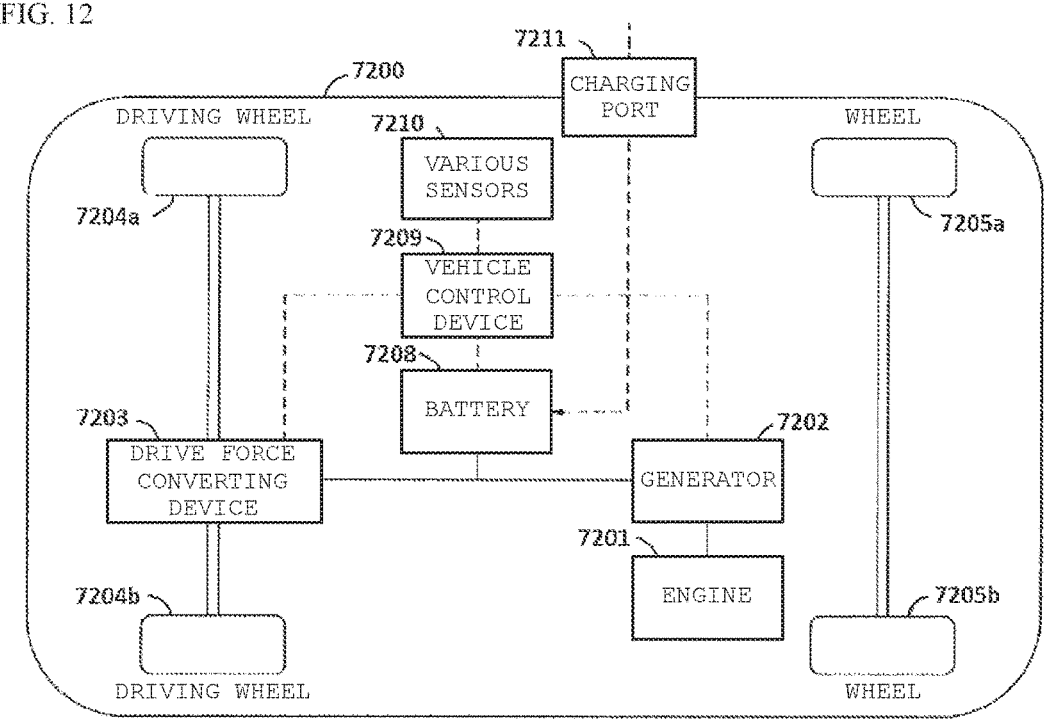
FIG. 12 is a block diagram illustrating a configuration of an application example according to an embodiment of the present technology.

FIG. 12 schematically illustrates an example of a configuration of a hybrid vehicle in which a series hybrid system, to which the present disclosure is applied, is used. The series hybrid system is a vehicle that travels by an electric power-drive force converting device (also referred to as a drive force converting device) using the electric power generated by a generator driven by an engine or the electric power temporarily stored in a battery.

A hybrid vehicle 7200 includes an engine 7201, a generator 7202, an electric power-drive force converting device 7203, a driving wheel 7204a, a driving wheel 7204b, a wheel 7205a, a wheel 7205b, a battery 7208, a vehicle control device 7209, various sensors 7210, and a charging port 7211. The power storage device (not illustrated) is applied to the battery 7208. The electric power-drive force converting device 7203 can receive the electric power from the battery pack (not illustrated) of the present technology to convert the electric power into the drive force of the vehicle, and the battery 7208 may include the battery pack (not illustrated) of the present technology.

The hybrid vehicle 7200 travels with the electric power-drive force converting device 7203 as a power source. An example of the electric power-drive force converting device 7203 is a motor. The electric power-drive force converting device 7203 is activated by the electric power of the battery 7208, and rotation force of the electric power-drive force converting device 7203 is transmitted to the driving wheels 7204a, 7204b. Using DC-AC or AC-DC conversion at a necessary place, the electric power-drive force converting device 7203 can be applied to either an AC motor or a DC motor. The various sensors 7210 control the engine speed through the vehicle control device 7209, and control an opening degree (throttle opening degree) of a throttle valve (not illustrated). The various sensors 7210 include a speed sensor, an acceleration sensor, and an engine speed sensor.

The rotation force of the engine 7201 is transmitted to the generator 7202, and the electric power generated by the rotation force using the generator 7202 can be stored in the battery 7208.

When the hybrid vehicle decelerates by a braking mechanism (not illustrated), decelerating resistance force is added to the electric power-drive force converting device 7203 as the rotation force, and regenerative electric power generated by the rotation force using the electric power-drive force converting device 7203 is stored in the battery 7208.

When the battery 7208 is connected to a power supply outside the hybrid vehicle, the battery 7208 can receive electric power from the external power supply with a charging port 211 as an input port, and store the received electric power.

Although not illustrated, the hybrid vehicle 7200 may include an information processing device that performs information processing relating to vehicle control based on information about the battery pack of the present technology. An information processing device that displays a remaining battery level based on information about a remaining amount of the battery cell included in the battery pack can be cited as an example of the information processing device.

By way of example, the series hybrid car travels by the motor using the electric power generated by the generator driven by the engine or the electric power temporarily stored in the battery. However, the present technology is also effectively applied to a parallel hybrid vehicle, in which outputs of both the engine and the motor are used as a drive source and three systems of traveling only with the engine, traveling only with the motor, and traveling with the engine and the motor are appropriately switched. The present technology can also be effectively applied to what is called an electrically driven vehicle that travels only by a drive motor with no use of the engine.

A power storage system of a sixth embodiment according to the present technology includes a power storage device including the battery pack of the present technology, a power consumption device to which the electric power is supplied from the battery pack, a control device (controller) that controls the power supply from the battery pack to the power consumption device, and a power generation device that charges the battery pack. The power storage system of the sixth embodiment according to the present technology may include the power storage device including the battery pack of the first embodiment according to the present technology, the battery pack of the second embodiment according to the present technology, the battery pack of the third embodiment according to the present technology, or the battery pack of the fourth embodiment according to the present technology, the power consumption device to which the electric power is supplied from the battery pack, a control device that controls the power supply from the battery pack to the power consumption device, and the power generation device that charges the battery pack. The power storage system of the sixth embodiment according to the present technology includes the battery pack of the present technology having the excellent heat dissipation and reliability, so that the performance of the power storage system can be improved.

Figure 13:
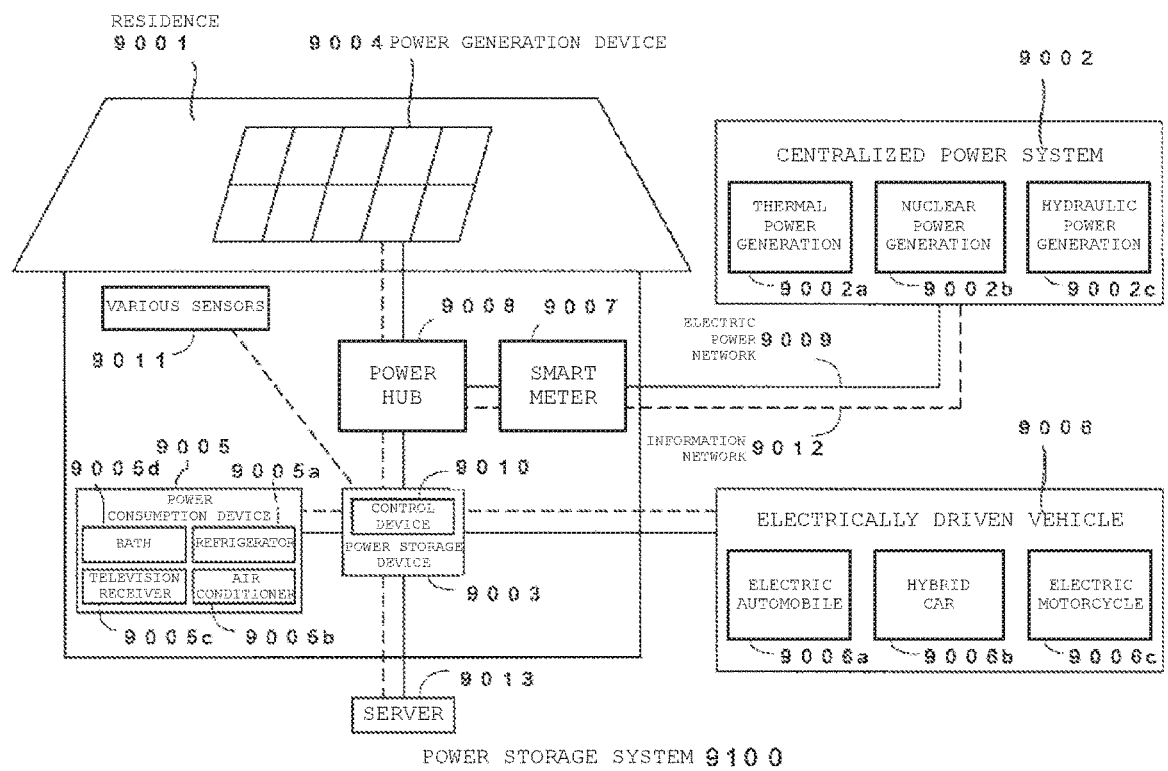
FIG. 13 is a block diagram illustrating a configuration of an application example according to an embodiment of the present technology.

A residential power storage system, which is an example of the power storage system of the sixth embodiment according to the present technology, will be described below with reference to FIG. 13.

For example, in a power storage system 9100 for a residence 9001, the electric power is supplied from a centralized power system 9002 such as thermal power generation 9002a, nuclear power generation 9002b, and hydraulic power generation 9002c to a power storage device 9003 through an electric power network 9009, an information network 9012, a smart meter 9007, and a power hub 9008. At the same time, the electric power is supplied from an independent power source such as a domestic power generation device 9004 to the power storage device 9003. The electric power supplied to the electric storage device 9003 is stored. The electric power used in the residence 9001 is supplied using the power storage device 9003. A similar power storage system can be used for a building as well as the residence 9001.

The power generation device 9004, a power consumption device 9005, the power storage device 9003, a control device 9010 that controls each device, the smart meter 9007, and a sensor 9011 that acquires various pieces of information are provided in the residence 9001. Each device is connected by the power network 9009 and the information network 9012. A solar cell, a fuel cell, or the like is used as the power generation device 9004, and the generated electric power is supplied to the power consumption device 9005 and/or the power storage device 9003. For example, the power consumption device 9005 is a refrigerator 9005a, an air conditioner 9005b, a television receiver 9005c, and a bath 9005d. The electric power consumption device 9005 includes an electrically driven vehicle 9006. The electrically driven vehicle 9006 is an electric automobile 9006a, a hybrid car 9006b, and an electric motorcycle 9006c.

The battery pack of the present technology is applied to the power storage device 9003. The power storage device 9003 is constructed with a battery cell (for example, a secondary battery) or a capacitor. For example, the electric storage device 9003 is constructed with a lithium ion battery. The lithium ion battery may be a stationary type or a type used in the electrically driven vehicle 9006. The smart meter 9007 has a function of measuring the usage amount of commercial power and sending the measured usage amount to an electric power company. In the electric power network 9009, any one of DC power feed, AC power feed, and contactless power feed or a combination thereof may be used.

Examples of the various sensors 9011 include a human sensor, an illuminance sensor, an object detection sensor, a power consumption sensor, a vibration sensor, a contact sensor, a temperature sensor, and an infrared sensor. The information acquired by the various sensors 9011 is transmitted to the control device 9010. Based on the information from the various sensors 9011, a state of weather, a state of a person, and the like are recognized, and the power consumption device 9005 is automatically controlled to minimize energy consumption. The control device 9010 can transmit information about the residence 9001 to an external electric power company or the like through the Internet.

The power hub 9008 performs processes such as branching of a power line and DC-AC conversion. Examples of a communication system of the information network 9012 connected to the control device 9010 include a method using a communication interface such as a Universal Asynchronous Receiver-Transmitter (UART) and a method using a sensor network pursuant to a wireless communication standard such as Bluetooth (registered trademark), ZigBee, and Wi-Fi. The Bluetooth (registered trademark) system is applied to multimedia communication, and can conduct one-to-many connection communication. ZigBee uses a physical layer of Institute of Electrical and Electronics Engineers (IEEE) 802.15.4. IEEE 802.15.4 is a name of a short-range wireless network standard called Personal Area Network (PAN) or W (Wireless) PAN.

The control device 9010 is connected to an external server 9013. The server 9013 may be managed by any one of the residence 9001, the electric power company, and a service provider. Examples of the information transmitted and received by the server 9013 include power consumption information, life pattern information, an electric charge, weather information, natural disaster information, and information about electricity transaction. These pieces of information may be transmitted and received from a power consuming device (for example, a television receiver) in a home, or transmitted and received from a device outside the home (for example, a mobile phone). These pieces of information may be displayed on a device, such as a television receiver, a mobile phone, and a Personal Digital Assistant (PDA), which has a display function.

The control device 9010 that controls each unit is constructed with a Central Processing Unit (CPU) or a processor, a Random Access Memory (RAM), and a Read Only Memory (ROM). In this example, the control device 9010 is accommodated in the power storage device 9003. The control device 9010 is connected to the power storage device 9003, the domestic power generation device 9004, the power consumption device 9005, the various sensors 9011, and the server 9013 through the information network 9012. For example, the control device 9010 has a function of adjusting a usage amount of the commercial power and a power generation amount. Additionally, the control device 9010 may have a function of performing the electricity transaction in an electric power market.

As described above, the electric power generated by not only the centralized power system 9002 such as the thermal power generation 9002a, the nuclear power generation 9002b, and the hydraulic power generation 9002c but also the domestic power generation device 9004 (solar power generation, wind power generation) can be stored in the power storage device 9003. Thus, even if the electric power generated by the domestic power generation device 9004 fluctuates, control can be performed such that the amount of electric power sent to the outside is kept constant or discharged as much as necessary. For example, the electric power obtained by photovoltaic power generation is stored in the power storage device 9003, midnight power in which the charge is cheap is stored in the power storage device 9003 at night time, and the power stored by the power storage device 9003 is discharged in a time period in which the daytime charge is high.

In this example, the control device 9010 is accommodated in the power storage device 9003. Alternatively, the control device 9010 may be accommodated in the smart meter 9007, or configured singly. The power storage system 9100 may be used for a plurality of homes in a condominium, or used for a plurality of detached residences.

An electric tool of a seventh embodiment according to the present technology is an electric tool including the battery pack of the present technology and a movable unit to which the electric power is supplied from the battery pack. The power tool of the seventh embodiment according to the present technology may include the battery pack of the first embodiment according to the present technology, the battery pack of the second embodiment according to the present technology, the battery pack of the third embodiment according to the present technology, or the battery pack of the fourth embodiment according to the present technology, and the movable unit to which the electric power is supplied from the battery pack. The power tool of the seventh embodiment according to the present technology includes the battery pack of the present technology having the excellent heat dissipation and reliability, so that the performance of the power tool can be improved.

The power tool of the seventh embodiment according to the present technology will be described below with reference to FIG. 14.

Figure 14:
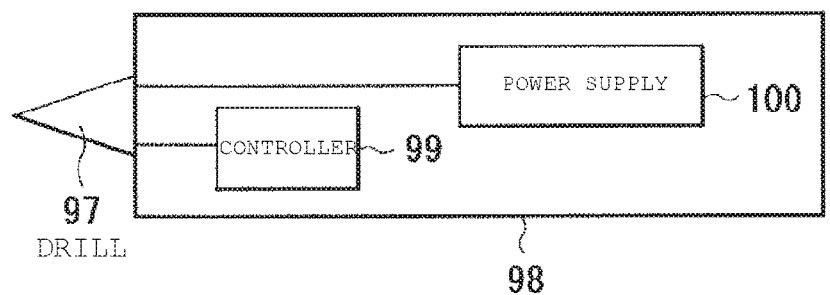
FIG. 14 is a block diagram illustrating a configuration of an application example according to an embodiment of the present technology.

FIG. 14 illustrates a block configuration of the electric tool. For example, the electric tool is an electric drill. The electric tool includes a controller 99 and a power supply 100 in a tool body 98 made of a plastic material. For example, a drill 97 that is the movable unit is operably (rotatably) attached to the tool body 98.

The controller 99 controls the operation of the whole electric tool (including the use state of the power supply 100), and includes, for example, a CPU. The power supply 100 includes the battery pack (not illustrated) of the present technology. The controller 99 supplies the electric power from the power supply 100 to the drill 97 in response to manipulation of an operation switch (not illustrated).

An electronic apparatus of an eighth embodiment according to the present technology is an electronic device, which includes the battery pack of the present technology and receives the electric power from the battery pack. The electronic device of the eighth embodiment according to the present technology may be an electronic device, which includes the battery pack of the first embodiment according to the present technology, the battery pack of the second embodiment according to the present technology, the battery pack of the third embodiment according to the present technology, or the battery pack of the fourth embodiment according to the present technology and receives the electric power from the battery pack. As described above, the electronic device of the eighth embodiment according to the present technology is a device that exerts various functions using the battery pack as the power source (power supply source) for driving. The electronic device of the eighth embodiment according to the present technology includes the battery pack of the present technology having the excellent heat dissipation and reliability, so that the performance of the electronic device can be improved.

Figure 15:
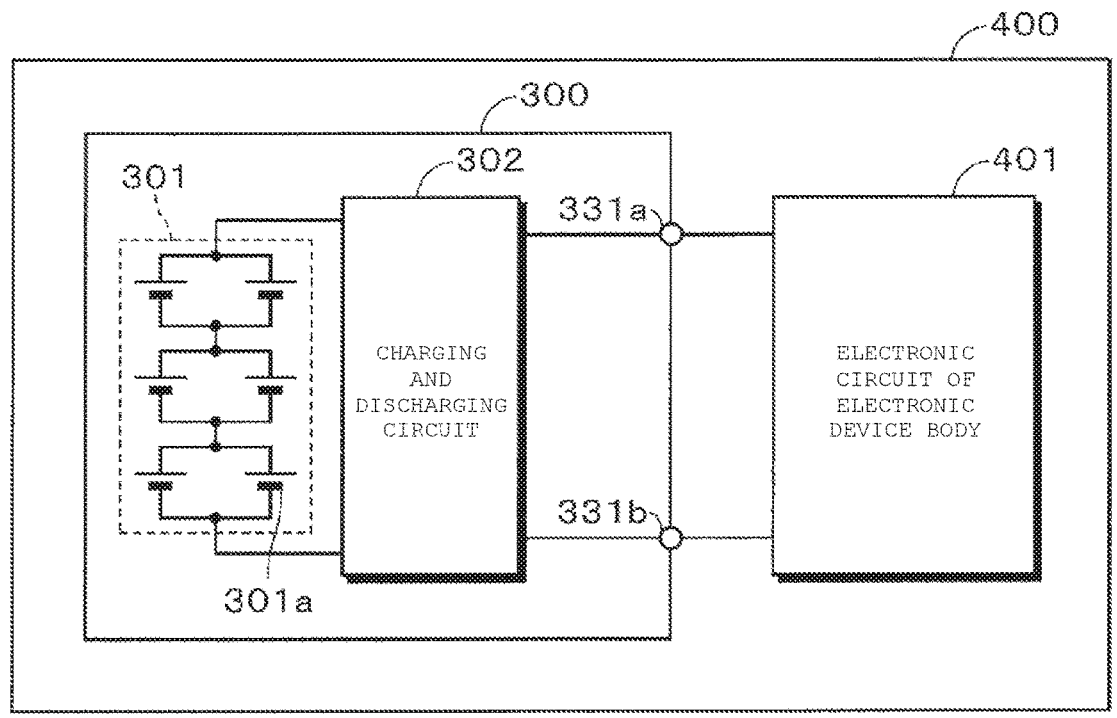
FIG. 15 is a block diagram illustrating a configuration of an application example according to an embodiment of the present technology.

Hereinafter, an electronic device of an eighth embodiment according to the present technology will be described with reference to FIG. 15.

An example of a configuration of an electronic device 400 of the eighth embodiment according to the present technology will be described below. The electronic device 400 includes an electronic circuit 401 of an electronic device body and a battery pack 300. The battery pack of the first embodiment according to the present technology, the battery pack of the second embodiment according to the present technology, the battery pack of the third embodiment according to the present technology, or the battery pack of the fourth embodiment according to the present technology can be applied to the battery pack 300. The battery pack 300 is electrically connected to the electronic circuit 401 through a positive electrode terminal 331a and a negative electrode terminal 331b. For example, the electronic device 400 has a configuration in which a user can detachably attach the battery pack 300. The electronic device 400 is not limited to this configuration, but the battery pack 300 may be built in the electronic device 400 such that the user cannot remove the battery pack 300 from the electronic device 400.

In charging the battery pack 300, the positive electrode terminal 331a and the negative electrode terminal 331b of the battery pack 300 are connected to a positive electrode terminal and a negative electrode terminal of a charger (not illustrated), respectively. On the other hand, in discharging the battery pack 300 (during use of the electronic device 400), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook type personal computer, a tablet type computer, a mobile phone (such as a smart phone), a Personal Digital Assistant (PDA), an imaging device (such as a digital still camera and a digital video camera), an audio device (such as a portable audio player), a game machine, a cordless phone slave device, an electronic book, an electronic dictionary, a radio, a headphone, a navigation system, a memory card, a pacemaker, a hearing aid, a lighting device, a toy, a medical device, and a robot, but the electronic device 400 is not limited thereto. The head mounted type display and the band type electronic device will be described as a specific example. The head mounted type display includes an image display device, a mounting device that mounts the image display device on a head of an observer, and an attachment member that attaches image display device to the mounting device, and the head mounted type display is an electronic device in which the battery pack of the first embodiment according to the present technology, the battery pack of the second embodiment according to the present technology, the battery pack of the third embodiment according to the present technology, or the battery pack of the fourth embodiment according to the present technology is used as the power supply for driving. The band type electronic device includes a plurality of segments connected in a band shape, a plurality of electronic components in the plurality of segments, and a flexible circuit board that is disposed into a meander shape in at least one segment and connects the plurality of electronic components in the plurality of segments, and the band type electronic device is an electronic device in which the battery pack of the first embodiment according to the present technology, the battery pack of the second embodiment according to the present technology, the battery pack of the third embodiment according to the present technology, or the battery pack of the fourth embodiment according to the present technology is disposed in the segment as the electronic component.

For example, the electronic circuit 401 includes a Central Processing Unit (CPU) or a processor, a peripheral logic unit, an interface unit, and a storage unit. The electronic circuit 401 controls the whole electronic device 400.

The battery pack 300 includes an assembled battery 301 and a charging and discharging circuit 302. The assembled battery 301 is configured by connecting a plurality of battery cells (for example, secondary batteries) 301a in series and/or in parallel. The plurality of battery cells 301a are connected to, for example, n parallel m series (n, m are positive integers). FIG. 14 illustrates an example in which six battery cells 301a are connected in two parallel three series (2P3S).

During the charging, the charging and discharging circuit 302 controls the charging of the assembled battery 301. On the other hand, during the discharging (that is, during use of the electronic device 400), the charging and discharging circuit 302 controls the discharging of the electronic device 400.

The present technology is described below in a further detail according to an embodiment.

[1]

The battery pack includes: a battery cell assembly including at least a battery cell, a heat dissipation member, and a plate member; and an exterior case. The heat dissipation member and the plate member are disposed in this order on at least one of (1) at least one electrode of the battery cell and (2) a side surface of the battery cell.

[2]

In the battery pack described in [1], the exterior case includes a surface opposed to a main surface of the plate member.

[3]

In the battery pack described in [1], the exterior case includes a tubular case.

[4]

In the battery pack described in [3], the tubular case includes a top surface and/or a bottom surface.

[5]

In the battery pack described in [3], the tubular case does not include a top surface portion and/or a bottom surface.

[6]

In the battery pack described in [1], the exterior case is constructed with a pair of exterior half bodies.

[7]

In the battery pack described in any one of [1] to [6], the exterior case includes a metal material.

[8]

In the battery pack described in any one of [1] to [7], the plate member includes a surface substantially perpendicular to a direction in which the battery cell assembly is assembled in the exterior case.

[9]

In the battery pack described in [8], the substantially perpendicular surface of the plate member is formed by bending the plate member from an end of the plate member.

[10]

In the battery pack described in any one of [1] to [9], the plate member contacts closely with an inner wall surface of a surface opposed to a main surface of the plate member, the exterior case including the surface opposed to the main surface of the plate member, and the battery cell assembly is accommodated in the exterior case.

[11]

In the battery pack described in any one of [1] to [9], the plate member contacts closely with an inner wall surface of a surface opposed to a main surface of the plate member with heat dissipation grease interposed therebetween, the exterior case including the surface opposed to the main surface of the plate member, and the battery cell assembly is accommodated in the exterior case.

[12]

In the battery pack described in any one of [1] to [11], the plate member includes a nonelastic material.

[13]

In the battery pack according to any one of [1] to [12], the heat dissipation member includes an elastic material.

[14]

In the battery pack described in any one of [1] to [13], the heat dissipation member has insulation, and the plate member includes a metal material.

[15]

A vehicle includes: the battery pack described in any one of [1] to [14]; a drive force converting device that receives electric power from the battery pack to convert the electric power into drive force of the vehicle; a drive unit that drive the vehicle according to the drive force; and a vehicle control device.

[16]

A power storage device includes: a power storage device including the battery pack described in any one of [1] to [14]; a power consumption device to which electric power is supplied from the battery pack; a control device that controls power supply from the battery pack to the power consumption device; and a power generator that charges the battery pack.

[17]

An electric tool includes: the battery pack described in any one of [1] to [14]; and a movable unit to which electric power is supplied from the battery pack.

[18]

An electronic device includes the battery pack described in any one of [1] to [14].

The electronic device receives electric power from the battery pack.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a battery cell assembly including at least a battery cell, a heat dissipation member, and a plate member; and
an exterior case,
wherein the exterior case includes at least a tubular case, a top lid and a bottom lid,
wherein the heat dissipation member and the plate member are disposed in this order on an electrode of the battery cell, and the plate member directly contacts with the heat dissipation member, and a size of the plate member is larger or equal to the heat dissipation member, and the heat dissipation member includes silicon, and wherein the battery pack further includes a second plate member in the tubular case with the battery cell interposed therebetween, and a distance between outer end faces of the plate member and the second plate member before the battery cell assembly is assembled in the tubular case is larger than an internal distance of the tubular case,
wherein the plate member contacts with an inner wall surface of the tubular case, and wherein the inner wall surface is opposed to a main surface of the plate member with heat dissipation grease interposed therebetween, and wherein the battery cell assembly is accommodated in the exterior case,
wherein the tubular case does not include an interface that separates the tubular case into at least two, and
wherein electrodes of the battery cell face the inner wall surface of the tubular case.

2. The battery pack according to claim 1, wherein the exterior case includes a metal material.

3. The battery pack according to claim 1, wherein the plate member has a first surface substantially perpendicular to a direction in which the battery cell assembly is assembled in the exterior case.

4. The battery pack according to claim 3, wherein the first surface of the plate member is formed by bending the plate member from an end of the plate member.

5. The battery pack according to claim 1, wherein the plate member includes a nonelastic material.

6. The battery pack according to claim 1, wherein the heat dissipation member includes insulating material, and the plate member includes a metal material.

7. The battery pack according to claim 1, wherein the heat dissipation grease is in contact with the inner wall surface of the tubular case, and wherein the inner wall surface of the tubular case does not include an opening.

8. A vehicle comprising: the battery pack according to claim 1;
   a drive force converter configured to receive electric power from the battery pack to convert the electric power into drive force of the vehicle;
   a driver configured to drive the vehicle according to the drive force; and
   a vehicle control device.

9. A power storage system comprising:
   a power storage device including the battery pack according to claim 1;
   a power consumption device to which electric power is configured to be supplied from the battery pack;
   a controller configured to control power supply from the battery pack to the power consumption device; and
   a power generator configured to charge the battery pack.

10. An electric tool comprising:
    the battery pack according to claim 1; and
    a movable unit to which electric power is configured to be supplied from the battery pack.

11. An electronic device comprising:
    the battery pack according to claim 1,
    wherein the electronic device is configured to receive electric power from the battery pack.

12. A battery pack comprising:
    a battery cell assembly including at least a battery cell, a heat dissipation member, and a plate member; and
    an exterior case,
    wherein the heat dissipation member and the plate member are disposed in this order on an electrode of the battery cell along a direction in which the battery cell assembly is assembled in the exterior case, and the plate member directly contacts with the heat dissipation member, and a size of the plate member is larger or equal to the heat dissipation member, and the heat dissipation member includes silicon, and wherein the battery pack further includes a second plate member in the tubular case with the battery cell interposed therebetween, and a distance between outer end faces of the plate member and the second plate member before the battery cell assembly is assembled in the tubular case is larger than an internal distance of the tubular case,
    wherein the plate member contacts with an inner wall surface of the exterior case, and wherein the inner wall surface is opposed to a main surface of the plate member with heat dissipation grease interposed therebetween, and wherein the battery cell assembly is accommodated in the exterior case, and
    wherein electrodes of the battery cell face the inner wall surface of the tubular case.

* * * * *